(12) United States Patent
Ishimoto et al.

(10) Patent No.: US 7,836,243 B2
(45) Date of Patent: Nov. 16, 2010

(54) NONVOLATILE SEMICONDUCTOR MEMORY APPARATUS AND MEMORY SYSTEM

(75) Inventors: Takeshi Ishimoto, Kanagawa (JP); Kazuhiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 11/714,871

(22) Filed: Mar. 7, 2007

(65) Prior Publication Data
US 2007/0208906 A1 Sep. 6, 2007

(30) Foreign Application Priority Data
Mar. 1, 2006 (JP) ............................. 2006-070416

(51) Int. Cl.
*G06F 12/00* (2006.01)
(52) U.S. Cl. ............................. 711/103; 711/E12.008

(58) Field of Classification Search ....................... None
See application file for complete search history.

(56) References Cited

U.S. PATENT DOCUMENTS

2002/0188801 A1* 12/2002 Green ......................... 711/113
2005/0108594 A1* 5/2005 Menon et al. .................. 714/6
2005/0273552 A1* 12/2005 Brazis et al. ................ 711/104
2007/0074093 A1* 3/2007 Lasser ......................... 714/763

* cited by examiner

*Primary Examiner*—Denise Tran
(74) *Attorney, Agent, or Firm*—Rader, Fishman & Grauer PLLC

(57) ABSTRACT

A nonvolatile semiconductor memory apparatus is disclosed which includes: a nonvolatile memory configured to be electrically rewritable; and a controller configured to control access to the nonvolatile memory based on information about access to the nonvolatile memory; wherein the controller selects one of a plurality of trade-offs between access reliability and performance and carries out access control in accordance with the selected trade-off.

14 Claims, 23 Drawing Sheets

FIG.16A WHEN FLAG = 00
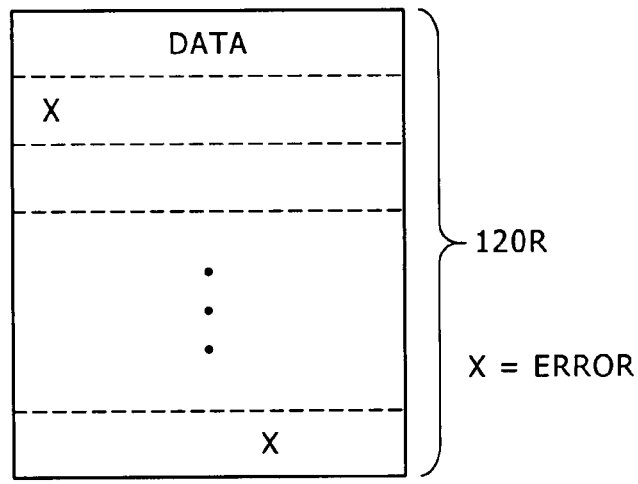
FIG.16B WHEN FLAG = 01
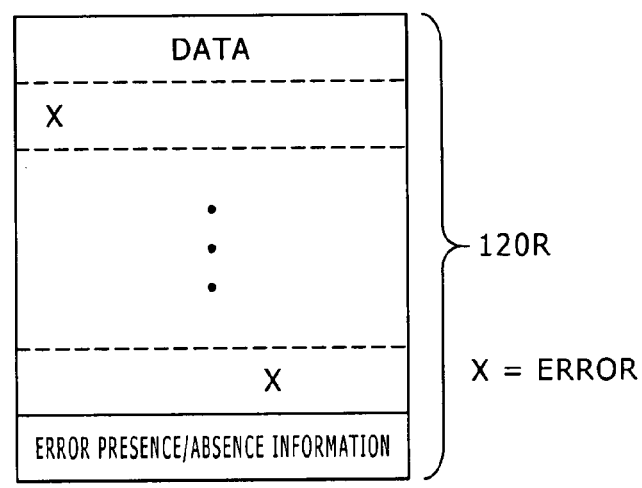
FIG.16C WHEN FLAG = 10
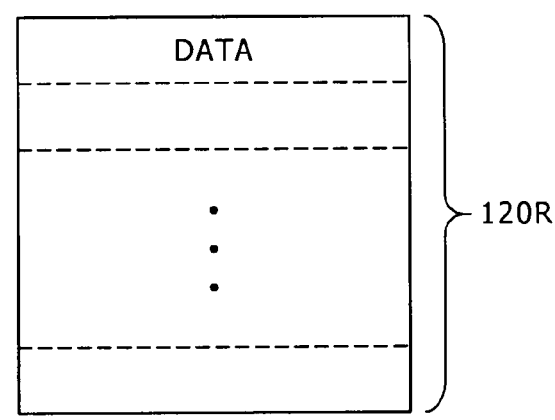

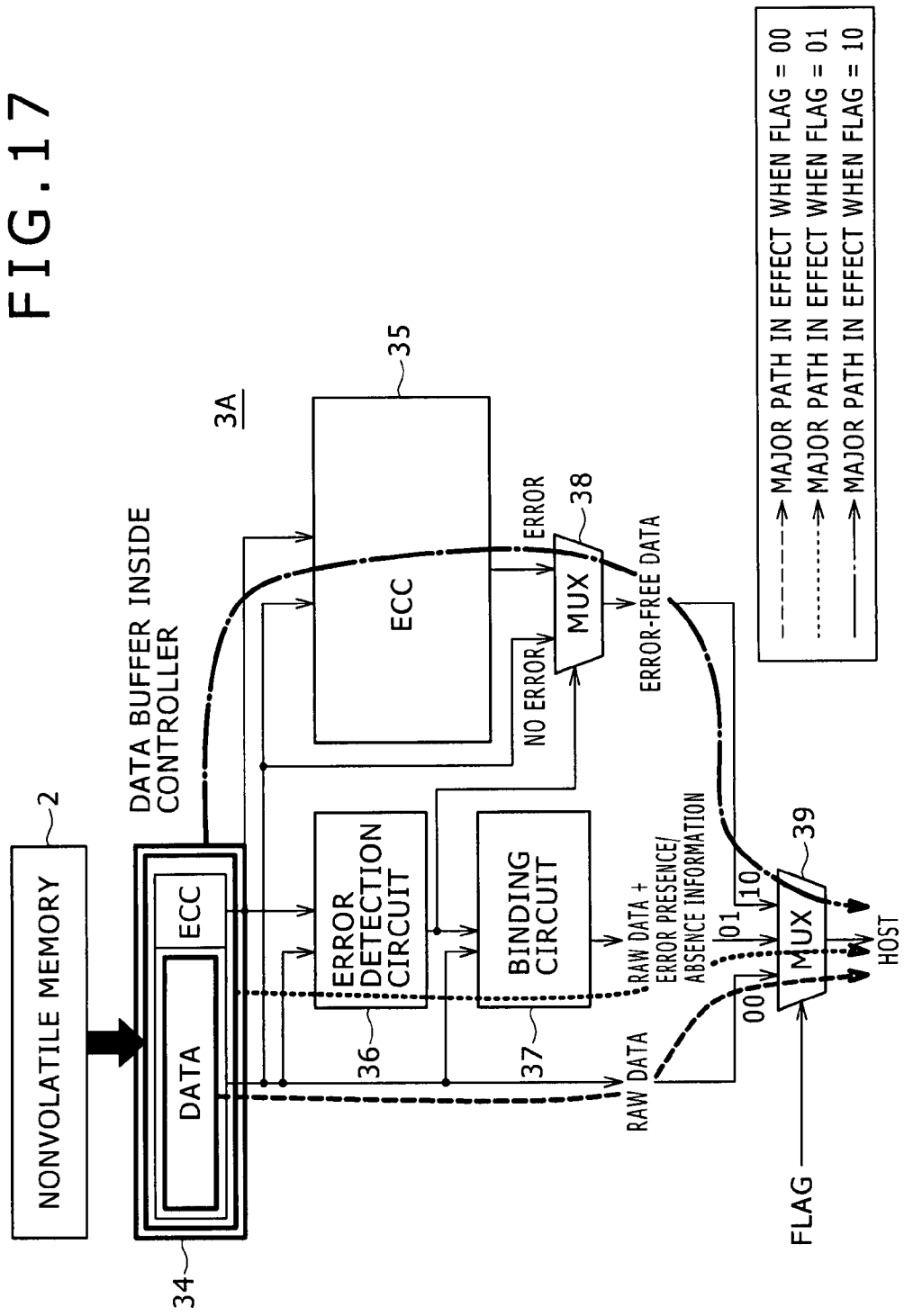

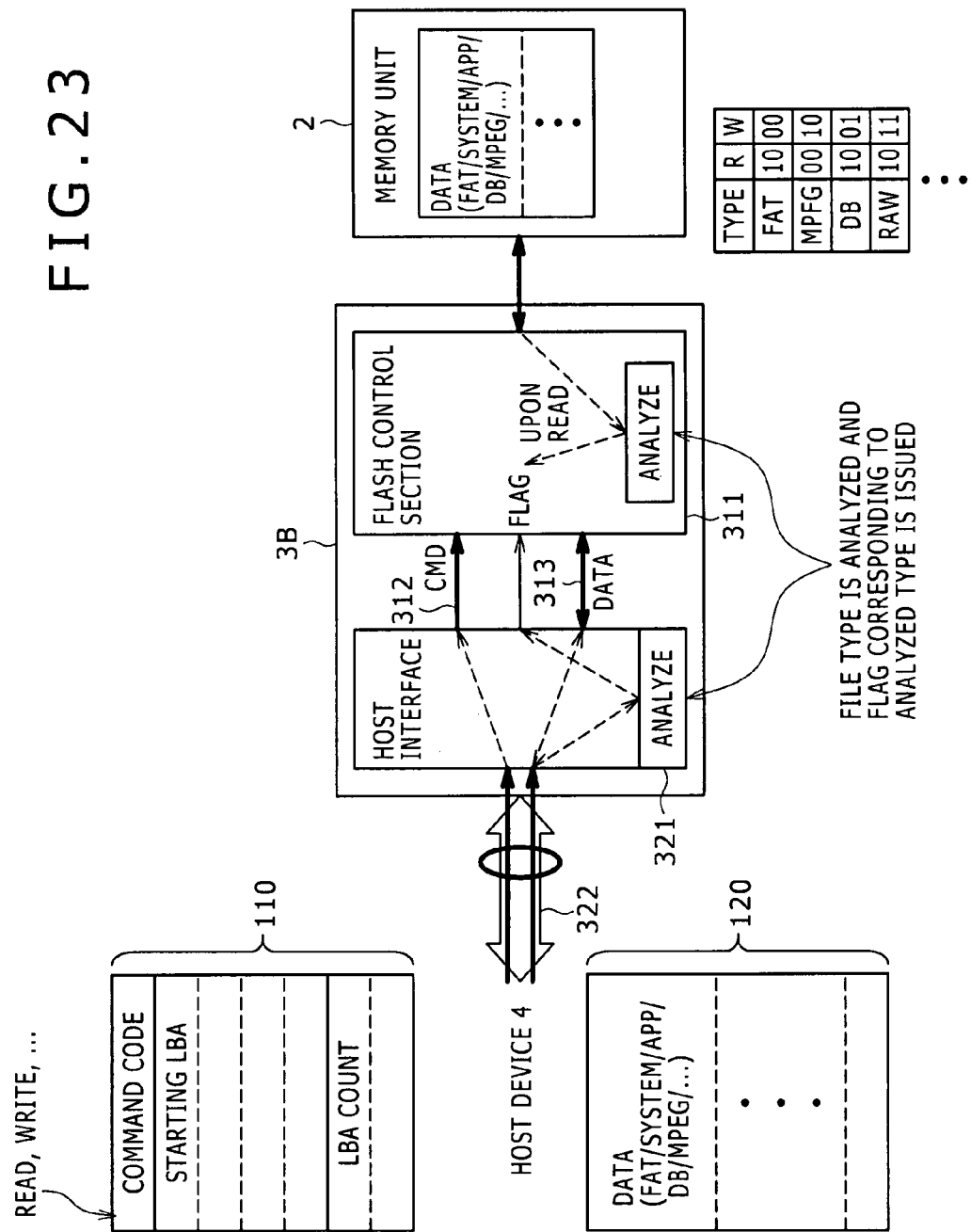

NONVOLATILE SEMICONDUCTOR MEMORY APPARATUS AND MEMORY SYSTEM

CROSS REFERENCES TO RELATED APPLICATIONS

The present invention contains subject matter related to Japanese Patent Application JP 2006-070416 filed with the Japanese Patent Office on Mar. 15, 2006, the entire contents of which being incorporated herein by reference.

BACKGROUND OF THE INVENTION

1. Field of the Invention

The present invention relates to a nonvolatile semiconductor memory apparatus such as a flash memory and to a memory system incorporating such apparatus.

2. Description of the Related Art

There exist storage systems wherein management information is written to a nonvolatile memory apart from user data. The reliability of this type of system in the face of a possible power failure or similar irregularities is affected by how often management information is written inside. The writing of management information, meanwhile, proves to be an overhead during a data write operation and thus can affect system performance in that state. That means there exists a trade-off between system reliability and performance upon data write.

Generally, a given nonvolatile memory storage system has its management information written thereto always in the same manner according to an information management technique adopted by the system in question. Management information is written to the system as it operates at a limited level of performance so as to maintain a predetermined level of reliability.

SUMMARY OF THE INVENTION

Such a fixed trade-off between reliability and performance can result in disadvantages. If the management technique in use focuses on reliability, management information is written in an excessively secure manner even in an environment where a power failure is highly unlikely. An inordinately high level of reliability is then ensured at the expense of a potentially higher level of performance. On the other hand, if the management technique places undue emphasis on performance, the system may not be able to handle a possible power failure incurred under certain circumstances. In this case, the system cannot secure a requisite level of reliability.

A large number of nonvolatile memory storage systems adopt the so-called error checking and correction (ECC) facility for recovery of user data from a failed nonvolatile memory. According to this facility, each set of data is furnished with a specific code when written to the memory so as to enable subsequent correction of one or multiple bits in each of such data sets. When a given data set is read from the memory, the code attached to that data set is checked to determine whether the retrieved data set is correct. An error, if detected, is corrected by the facility.

One disadvantage of the above scheme is that it takes time to carry out the ECC process and particularly to correct errors detected in the retrieved data. This can be a major factor contributing to a drop in performance.

Usually, each nonvolatile memory storage system executes always the same ECC process on its user data. The system continuously utilizes an ECC facility powerful enough to correct errors that may occur in the nonvolatile memory in use.

Meanwhile, certain types of user data may demand to be treated with emphasis more on the speed for read and write than on the reliability in terms of data bits. In such cases, the ECC process may preferably be discontinued on the data in order to avoid deterioration in performance.

The present invention has been made in view of the above circumstances and provides a nonvolatile semiconductor memory apparatus and a memory system capable of attaining requisite levels of reliability at each access time while ensuring a maximum level of performance under such reliability requirements.

In carrying out the present invention and according to one embodiment thereof, there is provided a nonvolatile semiconductor memory apparatus including: a nonvolatile memory configured to be electrically rewritable; and a controller configured to control access to the nonvolatile memory based on information about access to the nonvolatile memory. In the nonvolatile semiconductor memory, the controller selects one of a plurality of trade-offs between access reliability and performance and carries out access control in accordance with the selected trade-off.

Preferably, the controller may select management information writing frequency upon data write as one of the plurality of trade-offs and carry out access control in accordance with the selected management information writing frequency.

Preferably, the controller may select a degree of use of error checking and correction as one of the plurality of trade-offs and carry out access control in accordance with the selected degree of use of error checking and correction.

Preferably, the information about the access may include either a data write command or a data read command issued by a host device and flag information attached to the command, the flag information being set to correspond to a plurality of trade-offs; and the controller may carry out access control in accordance with the flag information.

Preferably, the information about the access may include a command and flag information attached to the command, the command being issued apart from and prior to either a data write command or a data read command issued by a host device, the flag information being set to correspond to a plurality of trade-offs; and the controller may carry out access control in accordance with the flag information.

Preferably, the information about the access may include data and flag information attached to the data, the flag information being set to correspond to a plurality of trade-offs; and the controller may carry out access control in accordance with the flag information.

Preferably, the controller may analyze a data format, select one of the plurality of trade-offs in accordance with a result of the analysis, and carry out access control in keeping with the selected trade-off.

According to another embodiment of the present invention, there is provided a memory system including: a nonvolatile memory configured to be electrically rewritable; a controller configured to control access to the nonvolatile memory based on information about access to the nonvolatile memory; and a host device configured to issue commands to the controller for access to the nonvolatile memory. In the memory system, the controller selects one of a plurality of trade-offs between access reliability and performance and carries out access control in accordance with the selected trade-off.

The preferred embodiments of the present invention, implemented as outlined above, attain diversely requisite levels of reliability at times of access while permitting a maximum level of performance under such requirements.

BRIEF DESCRIPTION OF THE DRAWINGS

FIGS. 16A, 16B and 16C are schematic views each showing an example of data being sent from a controller to a host device in response to a read command issued with a specific parameter;

FIG. 17 is a schematic view showing a typical data path structure in which data to be output from the controller to the host device is created;

FIG. 23 is a schematic view showing how a trade-off is otherwise selected using the flag that is automatically selected from within the data in accordance with a data format analyzed by the controller.

DETAILED DESCRIPTION OF THE PREFERRED EMBODIMENTS

Figure 1:
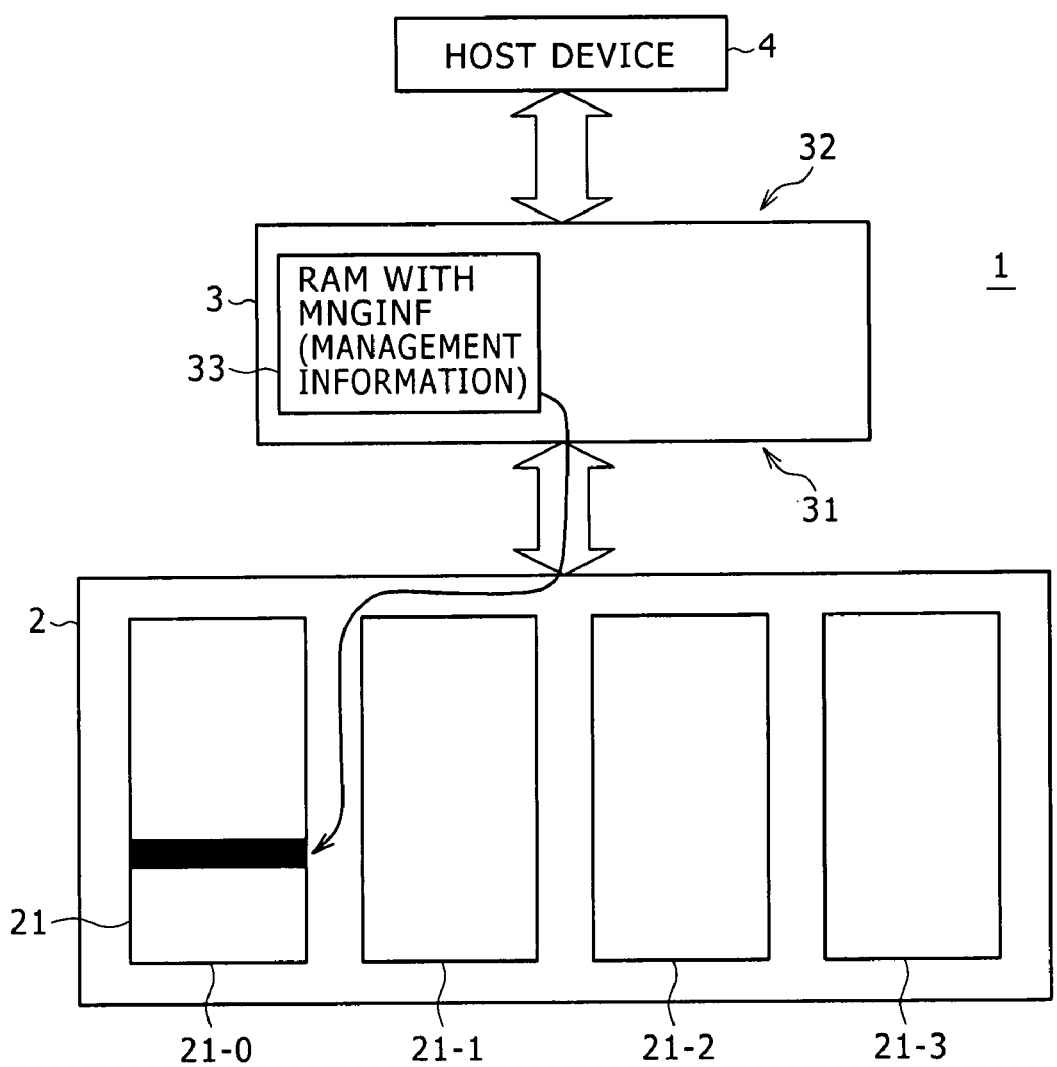
FIG. 1 is a schematic view showing a typical structure of a memory system incorporating a nonvolatile semiconductor memory apparatus practiced as one embodiment of the present invention.

The preferred embodiments of the present invention will now be described in reference to the accompanying drawings. FIG. 1 is a schematic view showing a typical structure of a memory system 1 incorporating a nonvolatile semiconductor memory apparatus practiced as one embodiment of the present invention.

The memory system 1 has at least one nonvolatile memory unit 2, a controller 3, and a host device 4 containing a CPU. The nonvolatile memory unit 2 has at least one nonvolatile memory bank 21. In the setup of FIG. 1, the nonvolatile memory unit 2 has four memory banks 21-0 through 21-3. The nonvolatile memory unit 2 is illustratively constituted by a NAND flash memory.

The controller 3 has one of its input/output sections (flash control section) 31 connected to the nonvolatile memory unit 2 and has another input/output section 32 connected to the host device 4 through a host interface. The controller 3 selects one of a plurality of trade-offs between access reliability and performance and carries out access control in accordance with the selected trade-off.

In the setup of FIG. 1, the controller 3 selects management information writing frequency upon data write as one of the trade-offs and carries out access control in accordance with the selected management information writing frequency. The controller 3 incorporates a volatile RAM 33 that contains management information MNGINF in its entirety or in part.

Figure 2:
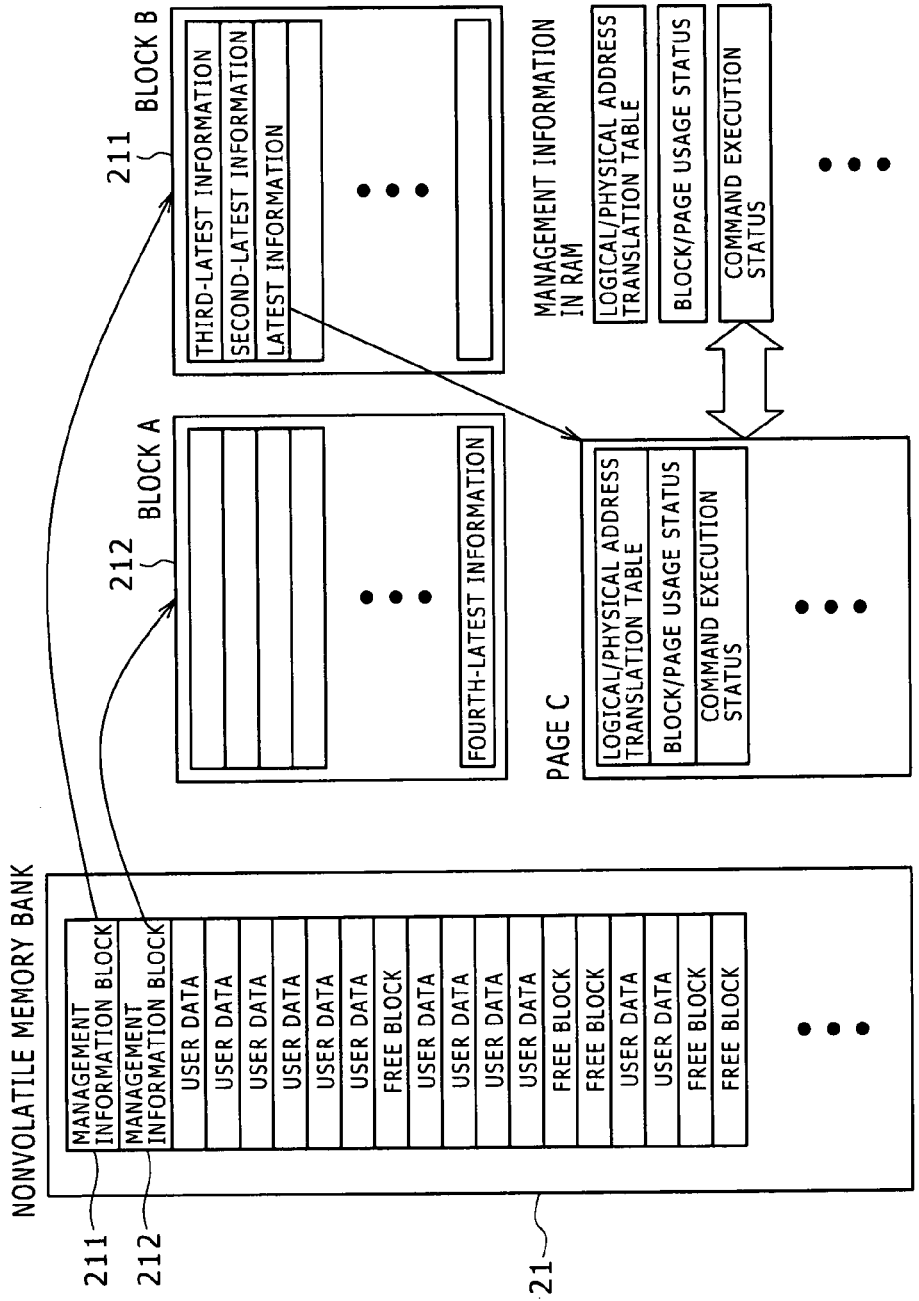
FIG. 2 is a schematic view showing how management information is structured in a nonvolatile memory and how such information is related to management information in a RAM.

FIG. 2 is a schematic view showing how management information is structured in a nonvolatile memory and how such information is related to management information in a RAM. The management information MNGINF is illustratively made up of a logical/physical address translation table and such status information as block/page use status in the nonvolatile memory and ongoing command execution status. As such, the management information is kept in a single page of the nonvolatile memory bank 21 (-0, 1, 2, 3).

The management information in the RAM 33 is written to management information blocks 211 and 212 (BLK-A, BLK-B) of the nonvolatile memory. This ensures that data management status at a given point in time is preserved even if power is removed.

Illustratively, the management information MNGINF is written to and managed in two blocks of the nonvolatile memory bank 21-0. The latest management information MNGINF is written to the next page in the block containing the second-latest management information. If all pages of that block are full, the content of the other block is deleted and the management information is written there from the first page onward. When the management information is written in this manner, the latest management information can be obtained from the last written page in the management information block that is filled halfway.

How user data and management information are written by the embodiment of the present invention is described below in reference to FIGS. 3 through 6.

Figure 3:
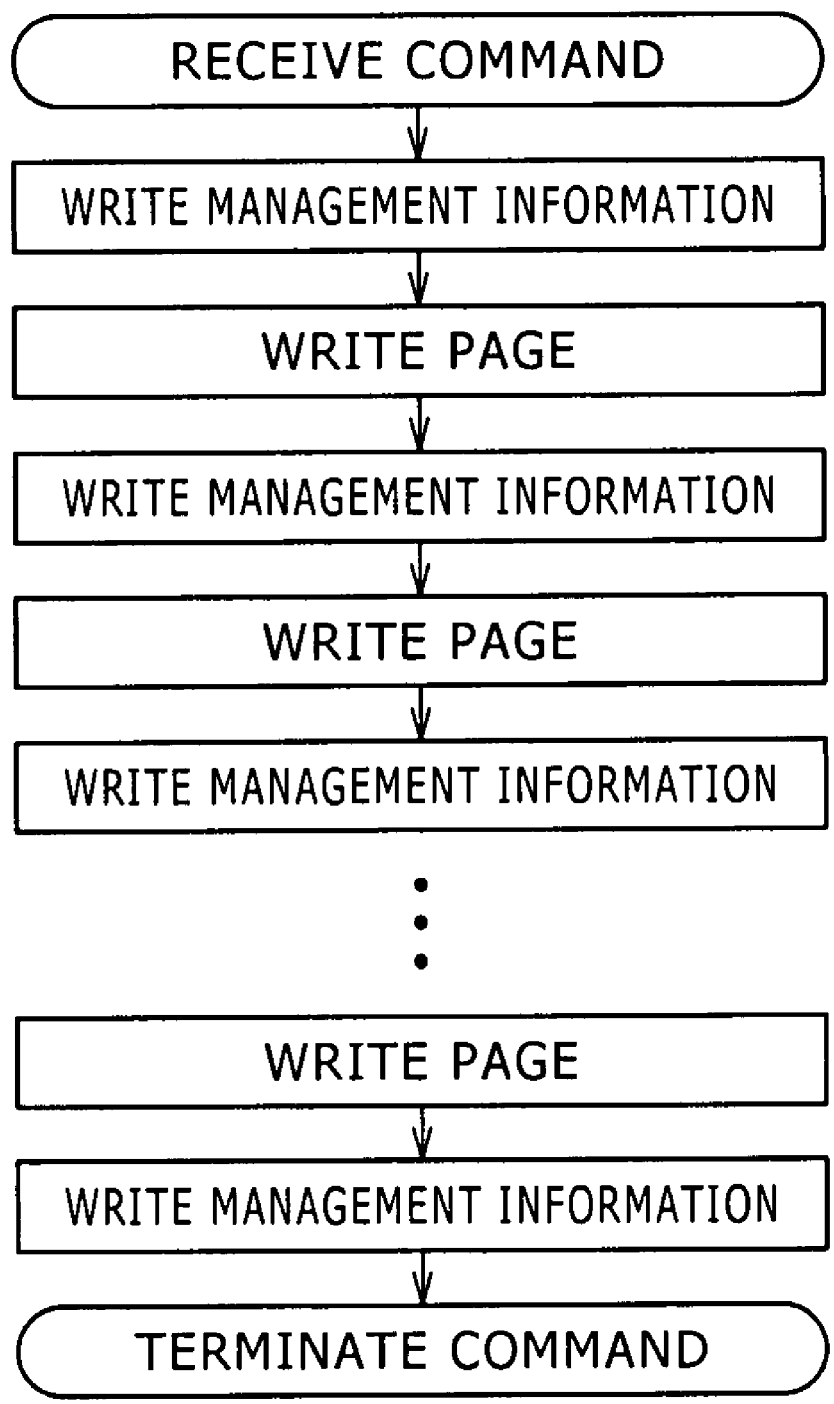
FIG. 3 is a flow diagram showing one example of how user data and management information are written according to the embodiment of the present invention.

FIG. 3 is a flow diagram showing one example of how user data and management information are written according to the embodiment. This is an example in which management information is more frequently written than in any other case in conjunction with user data.

Upon receipt of a write command from the host device, the controller 3 divides the writing of user data into page-by-page data write processes, each page being the smallest write increment in the nonvolatile memory bank 22. With this arrangement, management information is written always before and after each data write process.

More specifically, a management information write process and a per-page user data write process are alternated. Because the management information is updated on a page by page basis, highly accurate information about current status is available at any point in time at which power may be removed.

Figure 4:
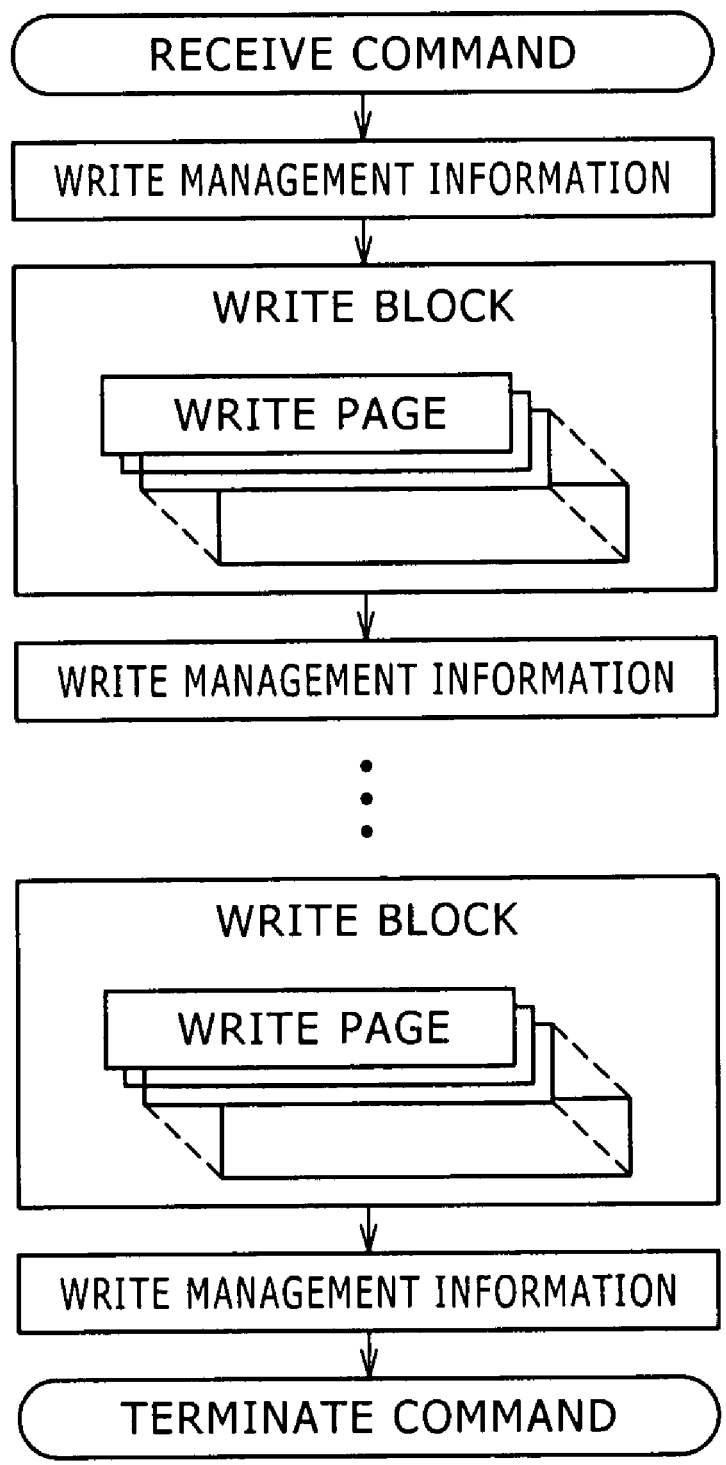
FIG. 4 is a flow diagram showing another example of how user data and management information are written according to the embodiment.

FIG. 4 is a flow diagram showing another example of how user data and management information are written according to the embodiment. In this example, management information is written per block of user data.

After receiving a write command from the host device, the controller 3 first writes management information and then alternates a user data block write process and a management information write process. If power is removed halfway through the ongoing user data block write process, the management information about the halfway-written block becomes inaccurate. However, write performance is higher than if management information is written page by page because user data is written on a block by block basis.

Figure 5:
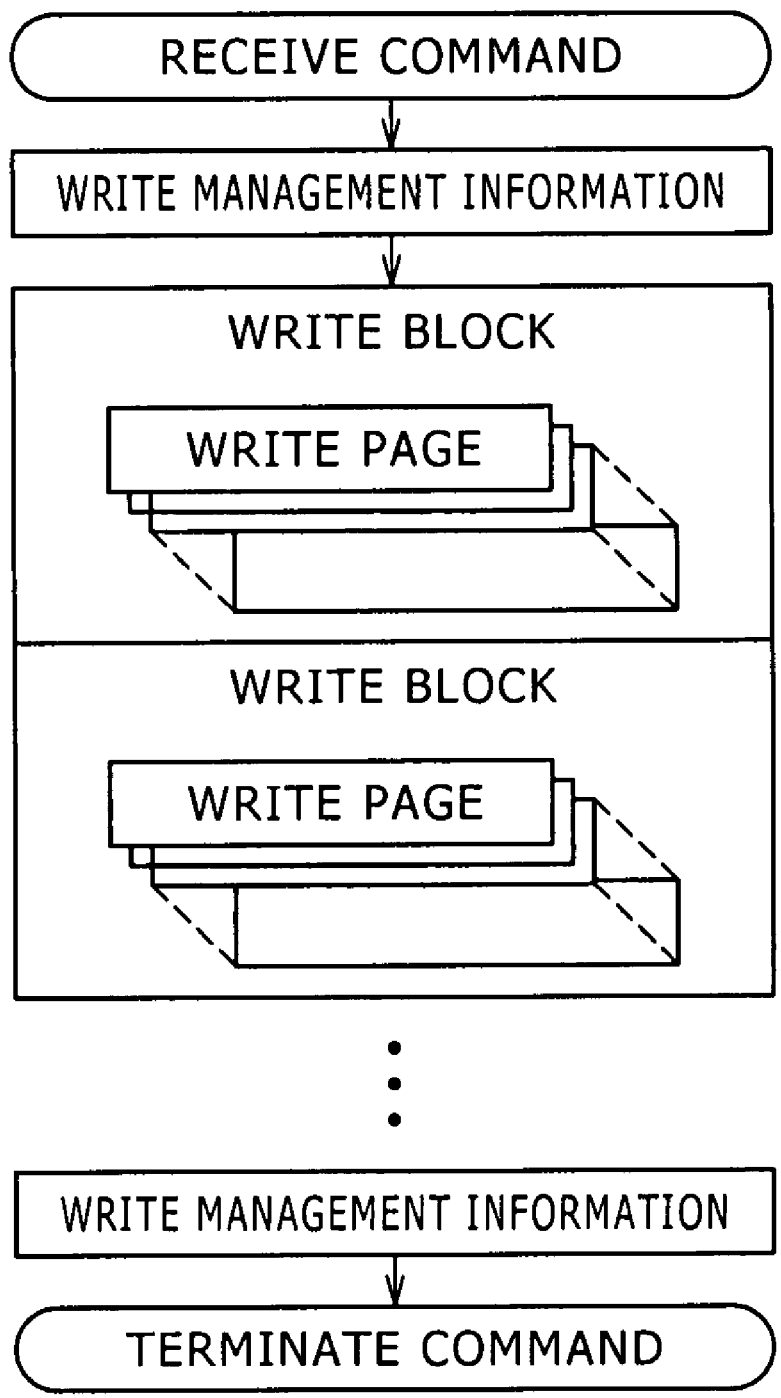
FIG. 5 is a flow diagram showing another example of how user data and management information are written according to the embodiment.

FIG. 5 is a flow diagram showing another example of how user data and management information are written according to the embodiment. In this example, management information is written only at the beginning and at the end of the execution of a write command. If power is removed halfway during a user data block write process, the management information about the data blocks having been written so far by this write command becomes inaccurate; the management information about all blocks is accurate upon termination of the command execution. In this case, write performance is still higher than if management information is written block by block.

Figure 6:
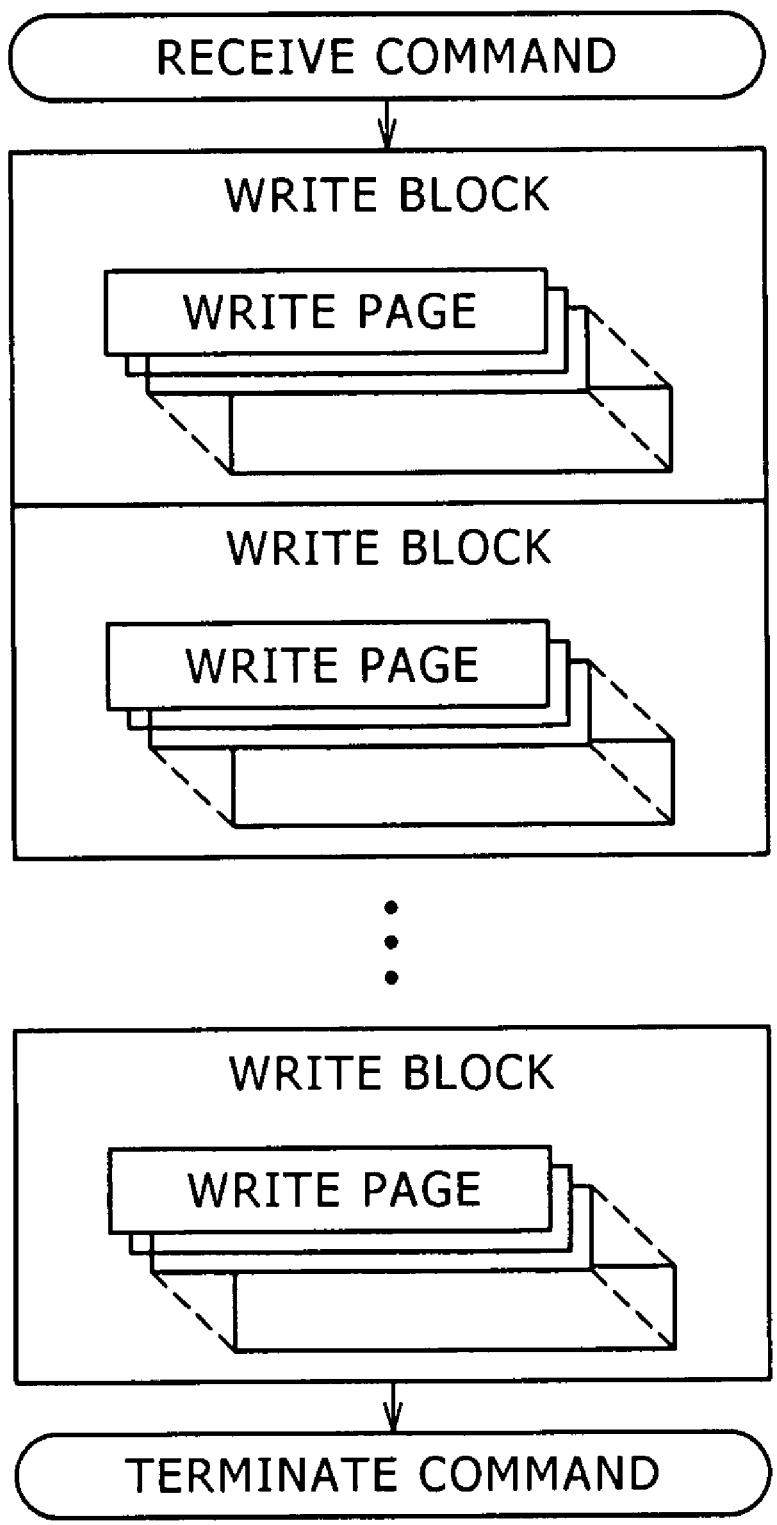
FIG. 6 is a flow diagram showing another example of how user data and management information are written according to the embodiment.
Figure 7:
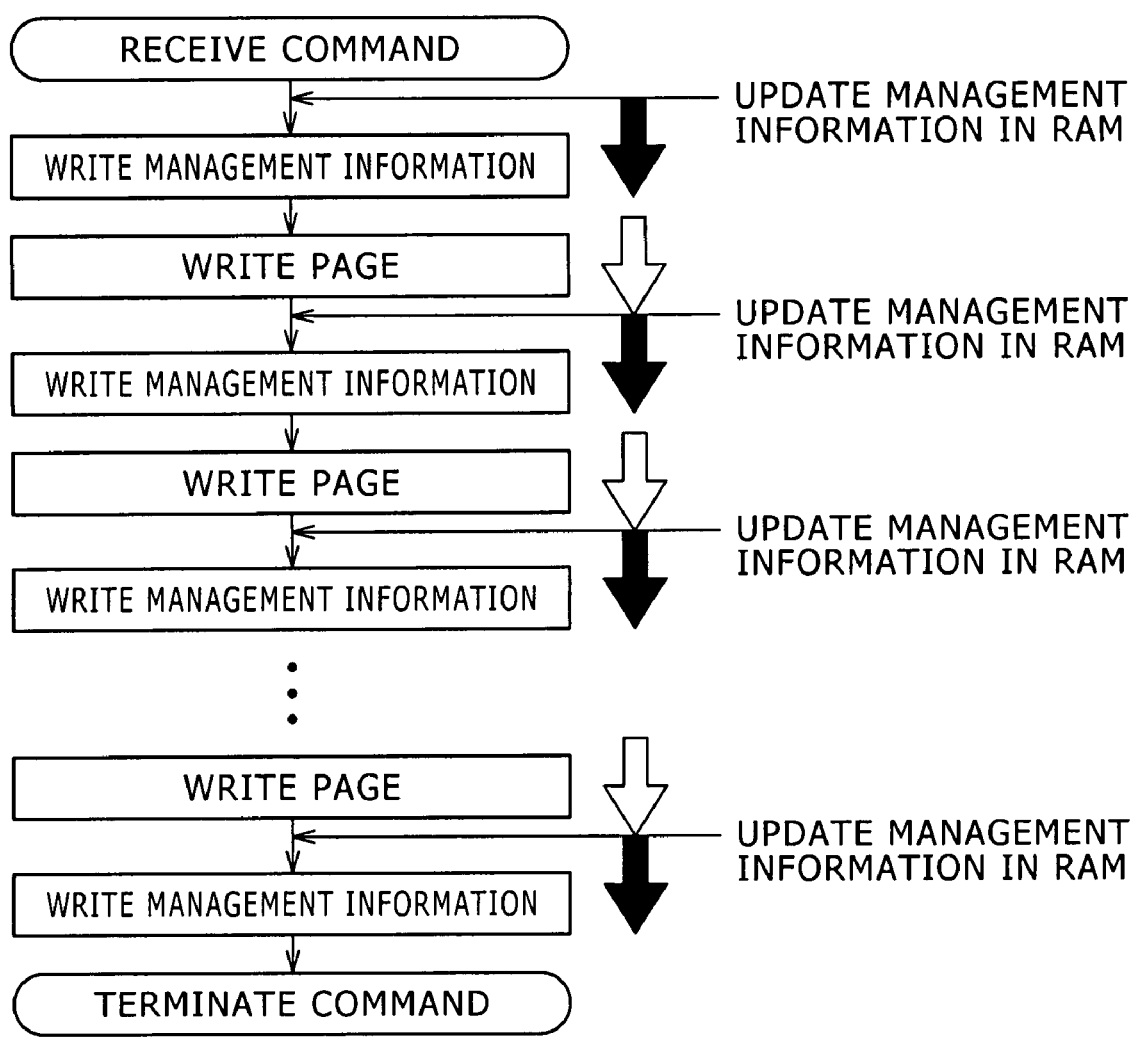
FIG. 7 is a flow diagram as a variation of the diagram of FIG. 3, showing how management information in the RAM is timed to be updated, how data written to the nonvolatile memory becomes inconsistent with the management information in the RAM, and how the management information in the RAM becomes inconsistent with management information in the nonvolatile memory.
Figure 8:
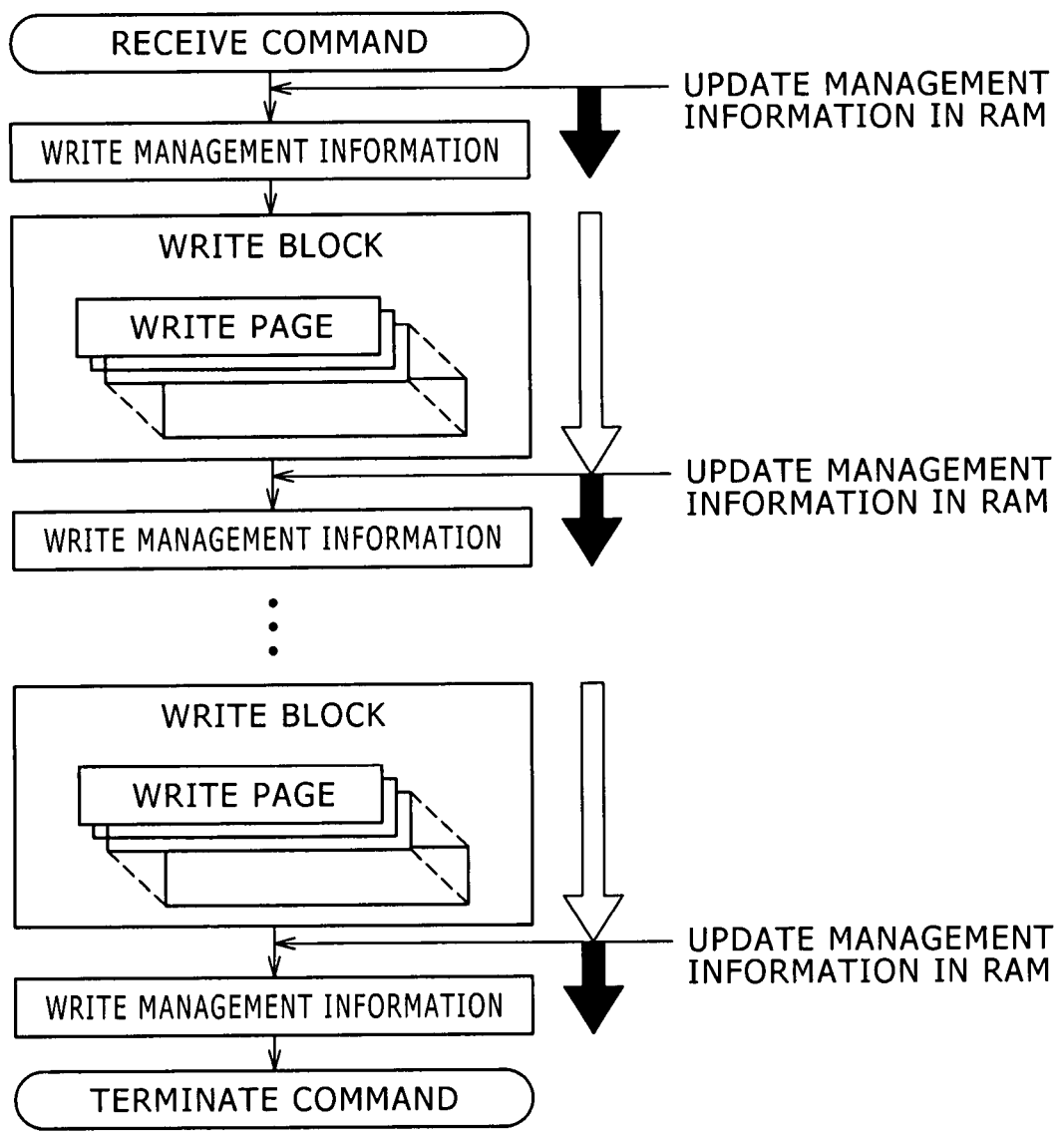
FIG. 8 is a flow diagram as a variation of the diagram of FIG. 4, showing how management information in the RAM is timed to be updated, how data written to the nonvolatile memory becomes inconsistent with the management information in the RAM, and how the management information in the RAM becomes inconsistent with management information in the nonvolatile memory.
Figure 9:
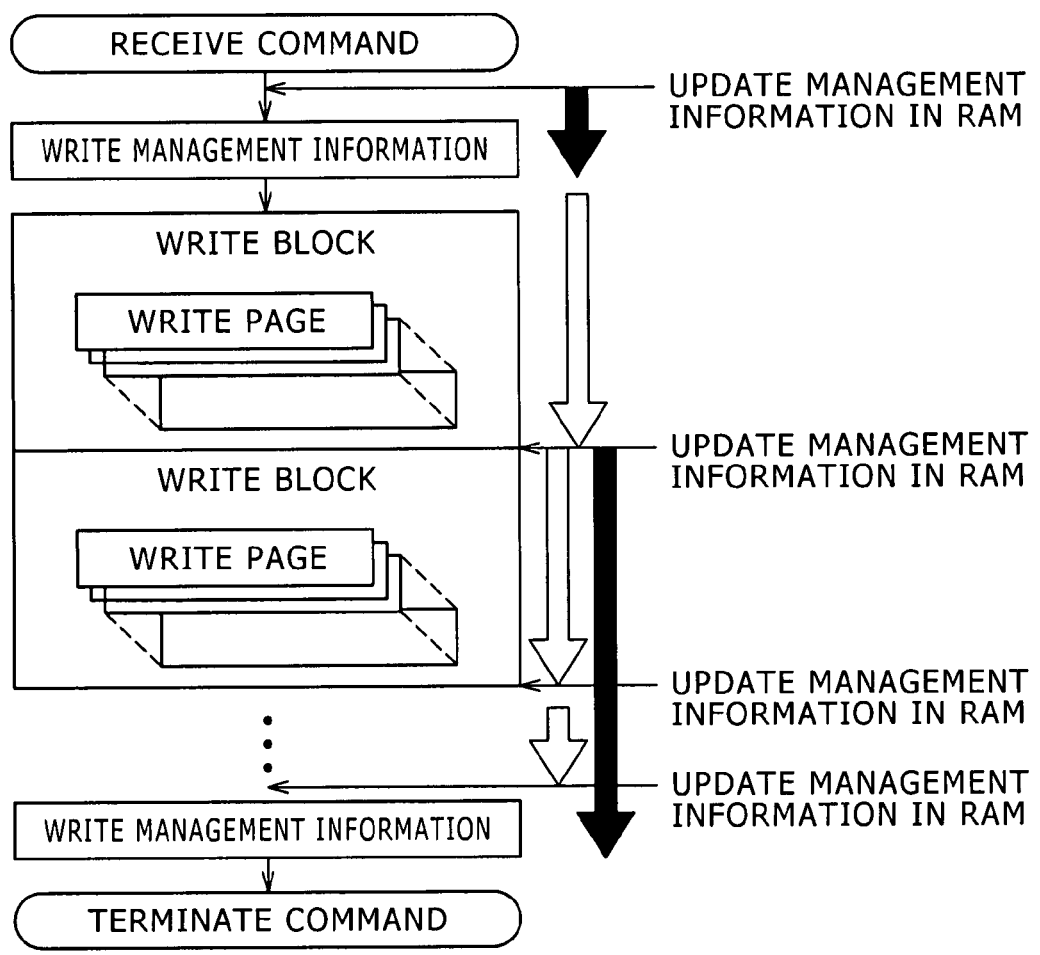
FIG. 9 is a flow diagram as a variation of the diagram of FIG. 5, showing how management information in the RAM is timed to be updated, how data written to the nonvolatile memory becomes inconsistent with the management information in the RAM, and how the management information in the RAM becomes inconsistent with management information in the nonvolatile memory.
Figure 10:
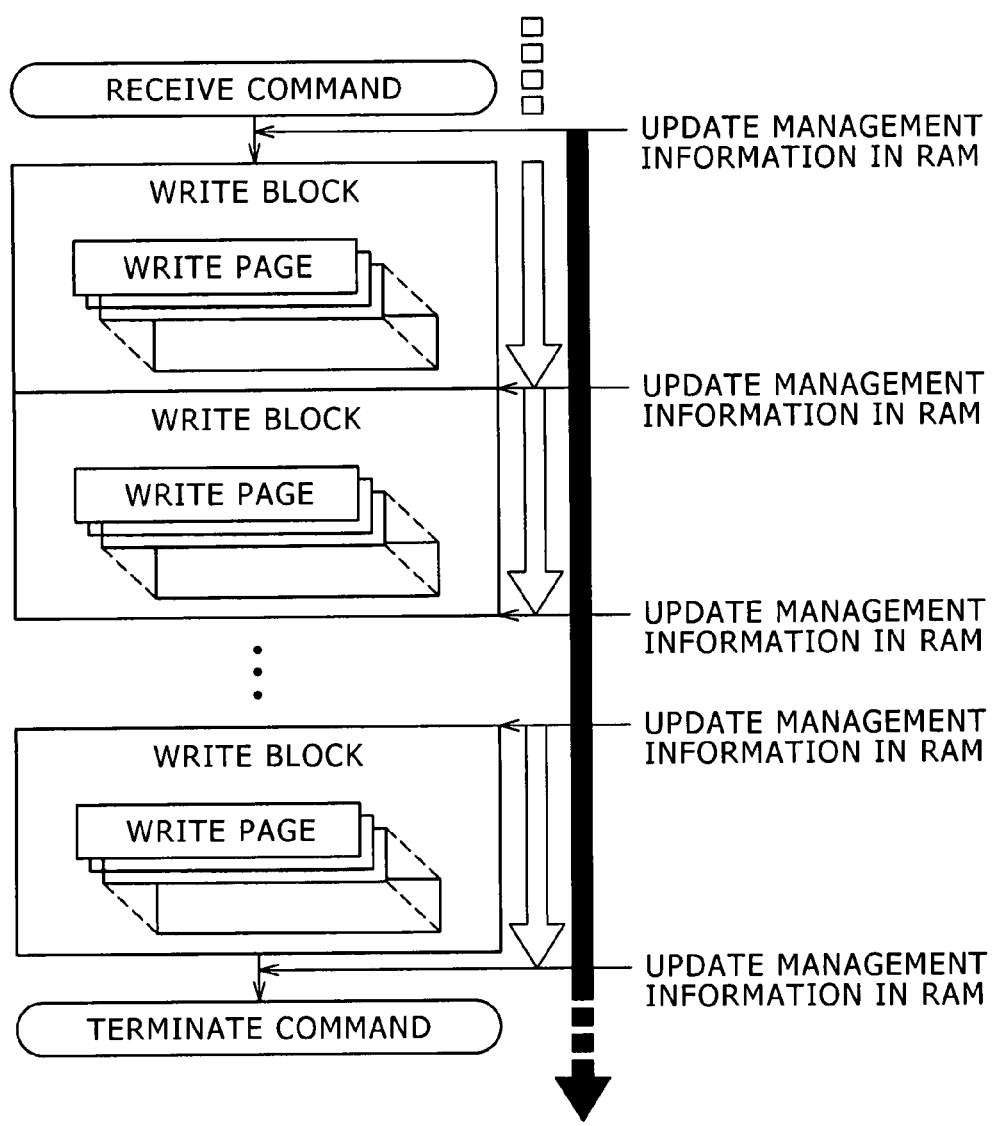
FIG. 10 is a flow diagram as a variation of the diagram of FIG. 6, showing how management information in the RAM is timed to be updated, how data written to the nonvolatile memory becomes inconsistent with the management information in the RAM, and how the management information in the RAM becomes inconsistent with management information in the nonvolatile memory.

FIG. 6 is a flow diagram showing another example of how user data and management information are written according to the embodiment. In this example, no management information is written during write command execution. Management information will have to be written every time the system is switched off, every time a predetermined number of write commands have been executed, or whenever a predetermined suitable event takes place.

The management information in the nonvolatile memory can be inaccurate even upon termination of write command execution. This generally demands to take appropriate steps for management information control before removal of power. In this case, write performance is the highest because the writing of user data is not hampered by processes for writing management information.

FIGS. 7, 8, 9 and 10 are flow diagrams as variations of the diagrams of FIGS. 3, 4, 5 and 6 respectively, showing how management information in the RAM 33 is timed to be updated, how data written to the nonvolatile memory becomes inconsistent with the management information in the RAM, and how the management information in the RAM becomes inconsistent with management information in the nonvolatile memory.

From the time data is written to the nonvolatile memory until the management information in the RAM is updated, there is a period during which the data in the nonvolatile memory, indicated by a hollow arrow in the figure, becomes inconsistent with the management information in the RAM.

Likewise, from the time the management information in the RAM is updated until that management information is written to the nonvolatile memory, there is a period during which the management information in the RAM, indicated by a solid arrow in the figure, becomes inconsistent with the management information in the nonvolatile memory.

If there is consistency between the data written in the nonvolatile memory and the management information in the RAM, as well as between the management information in the RAM and the management information in the nonvolatile memory, then there should be no problem in case of an unexpected removal of power.

If a power failure occurs during the period of inconsistency, any data written following the most recent point in time at which there existed consistency is not guaranteed.

Figure 11:
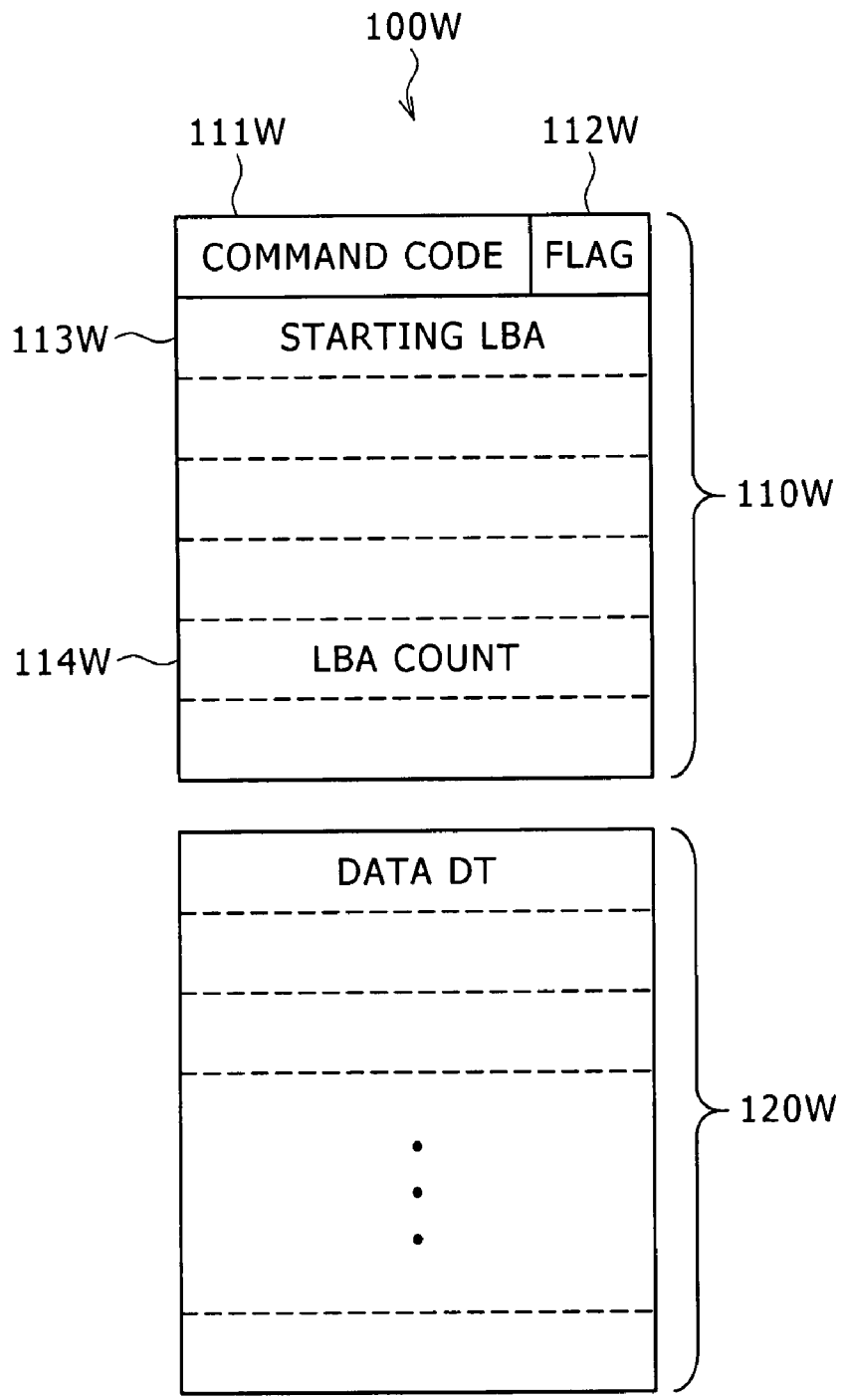
FIG. 11 is a schematic view showing a write command containing parameters for selecting a trade-off.

FIG. 11 is a schematic view showing a write command containing parameters for selecting a trade-off. As shown in FIG. 11, information 100W sent from the host device 4 is roughly divided into two parts: a command part 110W and a data part 120W.

The command part 110W includes: a command code 111W indicating that this is a write command; a flag field 112W representing a level of management information writing frequency; a starting LBA 113W designating, by use of a logical address, the location at which to start the write operation; and an LBA count 114W designating a write data size. The data part 120W accommodates the data to be actually written as user data to the nonvolatile memory.

At the time of a write, the command code 111W indicates that this command is designed to initiate a write operation. The flag field 112W is illustratively formed by two bits. The flag set to "00" in the write command indicates that management information is written page by page (corresponding to the processing of FIG. 3). The flag set to "01" indicates that management information is written block by block (corresponding to the processing of FIG. 4). The flag set to "10" indicates that management information is written at the beginning and at the end of write command execution (corresponding to the processing of FIG. 5). The flag set to "11" indicates that no management information is written during the command execution.

The starting LBA 113W represents the logical address of the location at which to start the write operation. The LBA count 114W denotes the range of the write operation. The data DT written in the data part 120W has a length corresponding to the LBA count 114W in the command part 110W.

Figure 12:
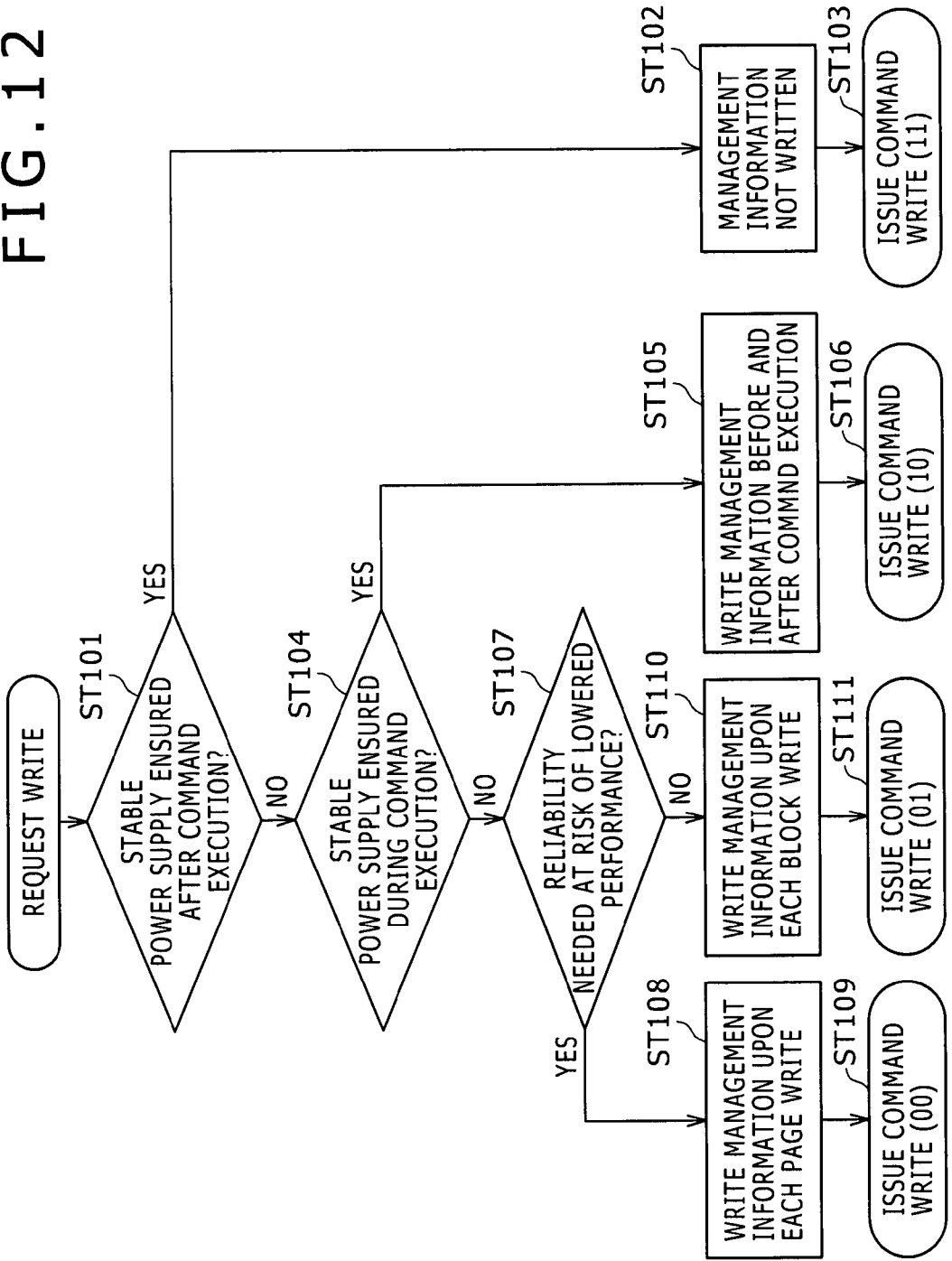
FIG. 12 is a flowchart of steps constituting a process whereby a host device selects a different management information writing method in view of stability status of power supply and a requisite level of reliability when issuing a write command.

FIG. 12 is a flowchart of steps constituting a process whereby a host device selects a different management information writing method in view of stability status of power supply and a requisite level of reliability when issuing a write command. The name of the command used by this process is "WRITE" as shown in FIG. 11, the command name being suffixed with the flag bits.

Where a stable supply of power is guaranteed during and after command execution, there is no need to write management information following the execution of each command. In this case, the host device issues a write command "WRITE (11)" dispensing with the writing of management information (in steps ST101, ST102 and ST103 of FIG. 12).

Where a stable supply of power is guaranteed during command execution but not thereafter, the host device issues a write command "WRITE(10)" involving the writing of management information before and after execution of the command (in steps ST101, ST104, ST105 and ST106).

Where there is a possibility of a power failure during command execution and where the highest possible level of reliability is desired regardless of degradation in performance, the host device issues a write command "WRITE(00)" involving the writing of management information on a page by page basis (in steps ST101, ST104, ST107, ST108 and ST109).

Where there is a possibility of a power failure during command execution and where a fairly high level of performance is desired, the host device issues a write command "WRITE (01)" involving the writing of management information on a block by block basis (in steps ST101, ST104, ST107, ST110 and ST111).

Figure 13:
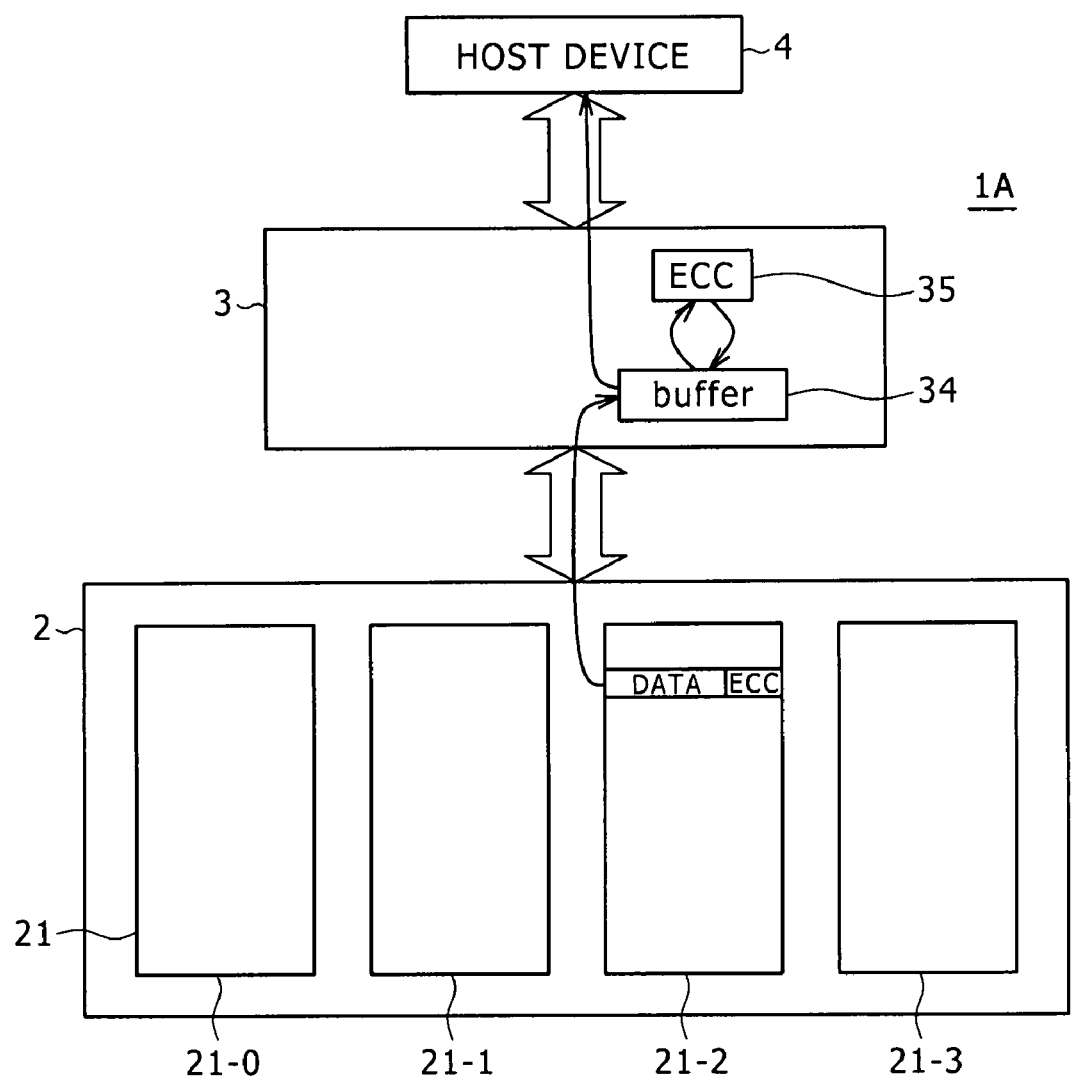
FIG. 13 is a schematic view showing a typical structure of a memory system incorporating a nonvolatile semiconductor memory apparatus practiced as another embodiment of the present invention.

FIG. 13 is a schematic view showing a typical structure of a memory system 1A incorporating a nonvolatile semiconductor memory apparatus practiced as another embodiment of the present invention. Unlike the above-described memory system 1, this memory system 1A has a controller 3A that includes a buffer 34 and an ECC circuit 35 in place of the RAM. At the time of a data read operation, the data placed into the buffer 34 is subjected to error checking and correction by the ECC circuit 35 before the data is output to the host device 4.

Figure 14:
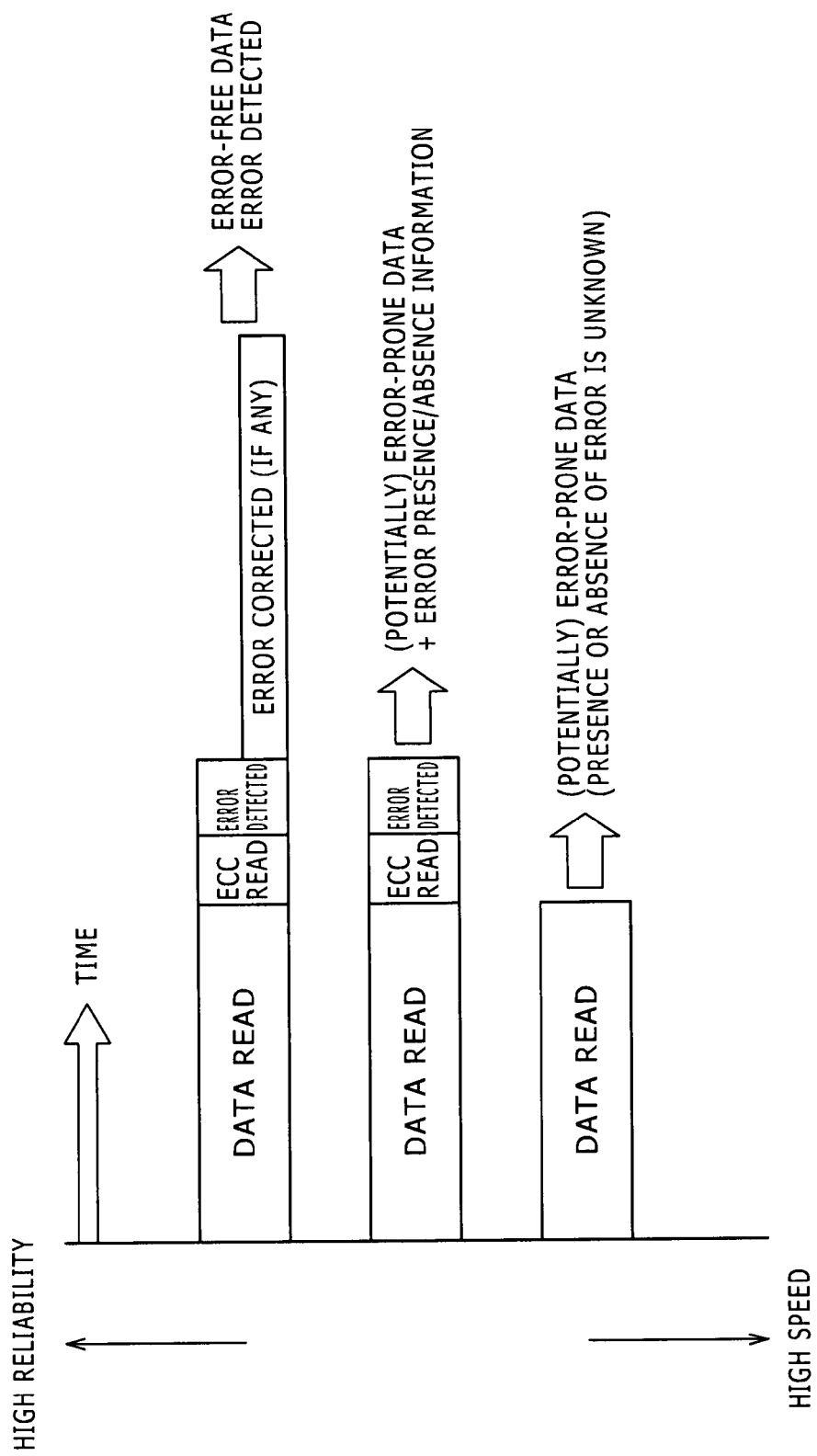
FIG. 14 is a schematic view explanatory of trade-offs between the times requisite for different data read operations on the one hand and their resulting levels of reliability on the other hand.

FIG. 14 is a schematic view explanatory of trade-offs between the times requisite for different data read operations on the one hand and their resulting levels of reliability on the other hand.

To acquire error-free data generally demands to read data along with its ECC information from the nonvolatile memory and having the read data checked by the ECC circuit and corrected thereby if there is an error.

If it is enough to know the presence or absence of error in the read data, the data need only be read along with its ECC information that is checked for error by the ECC circuit. This procedure points to potentially error-prone data along with information about the presence or absence of error in the data.

If it is enough to read data which may or may not have error, with no information demanded about the presence or absence of error in the read data, then the data need only be read out. In this case, the ECC circuit 35 need not be activated and the controller can save on power accordingly.

Figure 15:
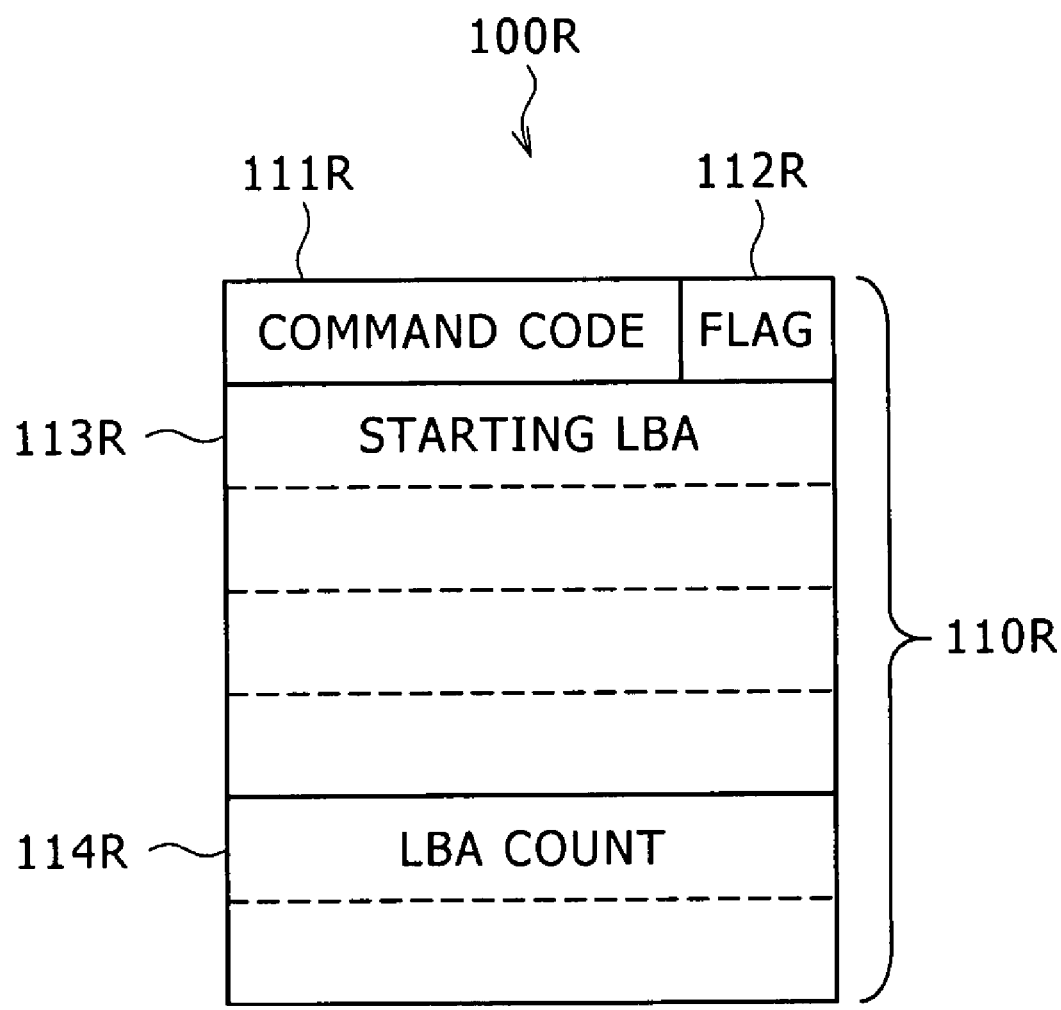
FIG. 15 is a schematic view showing a read command containing parameters for selecting a trade-off.

FIG. 15 is a schematic view showing a read command containing parameters for selecting a trade-off. FIGS. 16A, 16B and 16C are schematic views each showing an example of data being sent from the controller to the host device in response to a read command issued with a specific parameter.

Information 100R sent from the host device is constituted solely by a command part 110R as shown in FIG. 15. The command part 110 includes: a command code 111R indicating that this is a read command; a flag field 112R representing a processing level of error checking and correction; a starting LBA 113R designating, by use of a logical address, the location from which to start the read operation; and an LBA count 114R designating a read data size.

At the time of a read, the command code 111R indicates that this command is designed to initiate a read operation. The flag field 112R is illustratively formed by two bits. The flag set to "00" in the read command indicates that read data alone is output without the ECC process. The flag set to "01" indicates that read data is output along with information about the presence or absence of error in the data. The flag set to "10" indicates that read data is output after any error that may be detected in the data has been removed. The flag "11" is not used with this command.

The starting LBA 113R represents the logical address of the location from which to start the read operation. The LBA count 114R denotes the range of the read operation.

In the read command, a data part 120R corresponding to the data part in the write command constitutes data to be sent from the controller to the host device 4 as indicated in FIGS. 16A, 16B and 16C.

FIG. 16A shows read data in effect with the flag set to "00," so that no ECC process is carried out. In this case, potentially error-prone data alone is sent to the host device 4.

FIG. 16B shows read data in effect with the flag set to "01," so that the ECC process is carried out on the data just to determine whether there is error in the data. In this case, potentially error-prone data is sent to the host device 4 along with information about the presence or absence of error in the data.

FIG. 16C shows read data in effect with the flag set to "10," so that the ECC process is carried out on the data to check for and correct any error that may be detected in the data. In this case, error-free data is sent to the host device 4.

FIG. 17 is a schematic view showing a typical data path structure in which the data to be output from the controller 3A to the host device is created. The controller 3A has a buffer 34, an ECC (error checking and correction) circuit 35, an error detection circuit 36, a binding circuit 37, and multiplexers 38 and 39.

The buffer 34 retains the data that has been read from the nonvolatile memory unit 2. The read data is supplemented by ECC information. The ECC circuit 35 performs error checking and correction on the data in the buffer 34 in accordance with the ECC information. The error detection circuit 36 checks to determine if there is error in the raw data held in the buffer 34 on the basis of the ECC information. The binding circuit 37 supplements the raw data in the buffer 34 with error presence/absence information resulting from the operation of the error detection circuit 36.

The multiplexer 38 selects either the raw data coming from the buffer 34 or the processed data from the ECC data 35 depending on the result of the detection by the error detection circuit 36. The selected data is output to the multiplexer 39. If no error is detected, the multiplexer 38 selects the error-free raw data; if error is detected, the multiplexer 38 selects the error-free data that has undergone the error correction process.

Depending on the flag information in the read information 100R, the multiplexer 39 selects one of three kinds of data: raw data held in the buffer 34, raw data supplemented with error presence/absence information by the binding circuit 37, or error-free data coming from the multiplexer 38. The selected data is output to the host device.

In the case of FIG. 16A where raw data read from the nonvolatile memory need be output to the host device 4 (flag=00), the data part may be read from the nonvolatile memory and then output unchecked to the host device 4, as shown in FIG. 17.

In the case of FIG. 16B where information about the presence or absence of error is requisite (flag=01), both data and ECC information are read from the nonvolatile memory and input to the error detection circuit 36 as shown in FIG. 17. In turn, the error detection circuit 36 creates error presence/absence information through the detection, binds the information to the initial data, and outputs the data-information combination to the host device 4.

In the case of FIG. 16C where error-free data is requisite (flag=10), both data and ECC information are read from the nonvolatile memory and input to the ECC circuit 35 for error checking and correction as shown in FIG. 17. If the data turns out to be free of error as a result of the error checking that takes place before the correction, then the data read from the nonvolatile memory is output uncorrected. If the data is found to have error following the checking and needs to be corrected, then the output of the ECC circuit 35 is sent to the host device 4.

Figure 18:
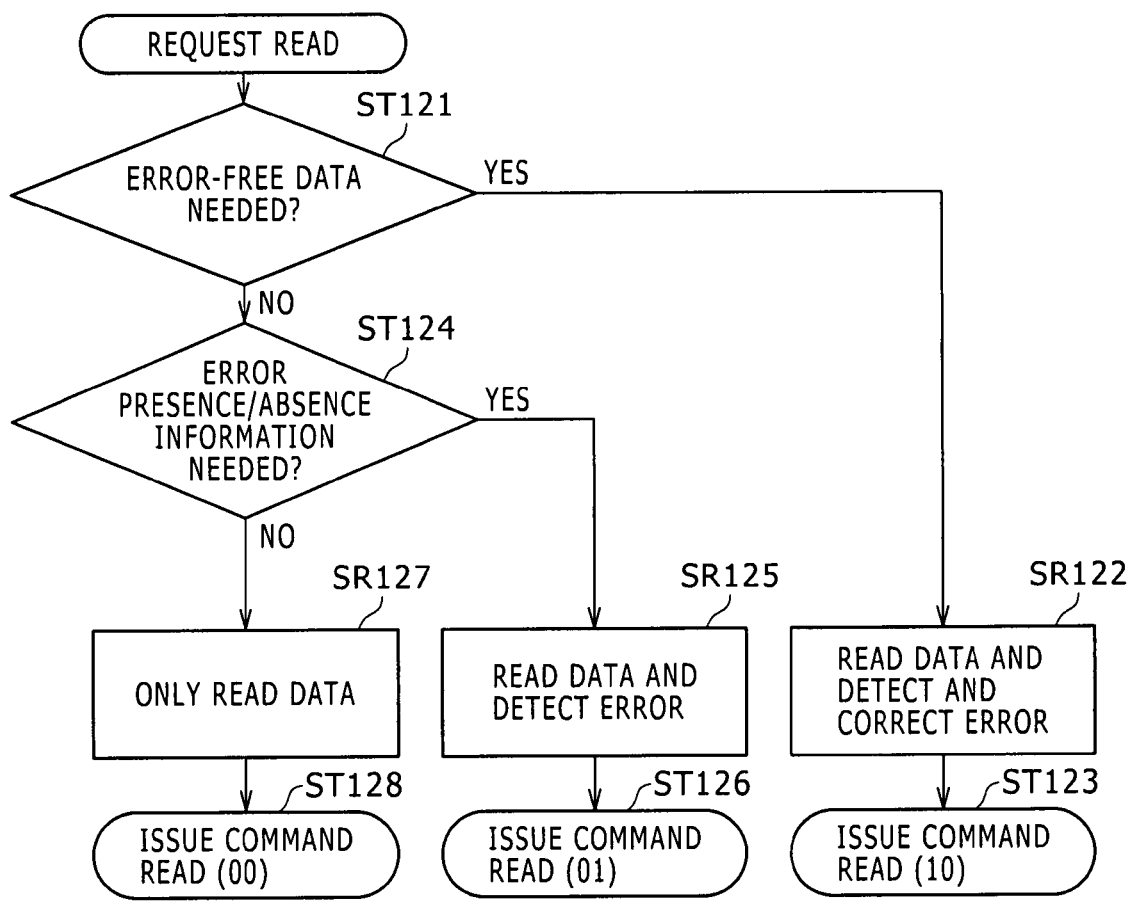
FIG. 18 is a flowchart of steps constituting a process whereby the host device selects a different data reading method in view of a requisite level of data reliability when issuing a read command.

FIG. 18 is a flowchart of steps constituting a process whereby the host device selects a different data reading method in view of a requisite level of data reliability when issuing a read command. The name of the command used by this process is "READ" as shown in FIG. 15, the command name being suffixed with the flag bits.

Where read data is desired to be free of error, the host device issues a command "READ(10)" involving both error checking and correction (in steps ST121, ST122 and ST123 of FIG. 18).

Where it is acceptable for read data to contain error provided that the data is furnished with error presence/absence information, the host device issues a command "READ(01)" involving error checking (in steps ST121, ST124, ST125 and ST126).

Where it is acceptable for read data to contain error, with no information requisite about the presence or absence of error in the data, the host device issues a command "READ(00)" involving the read operation only (in steps ST121, ST124, ST127 and ST128).

At the time of a write operation, as in the read operation, if target data need not be checked for error, the data can be written without ECC information. This translates into a shorted time for ECC calculations and a deactivated ECC circuit with little power dissipation thereby, so that power can be saved appreciably.

Figure 19:
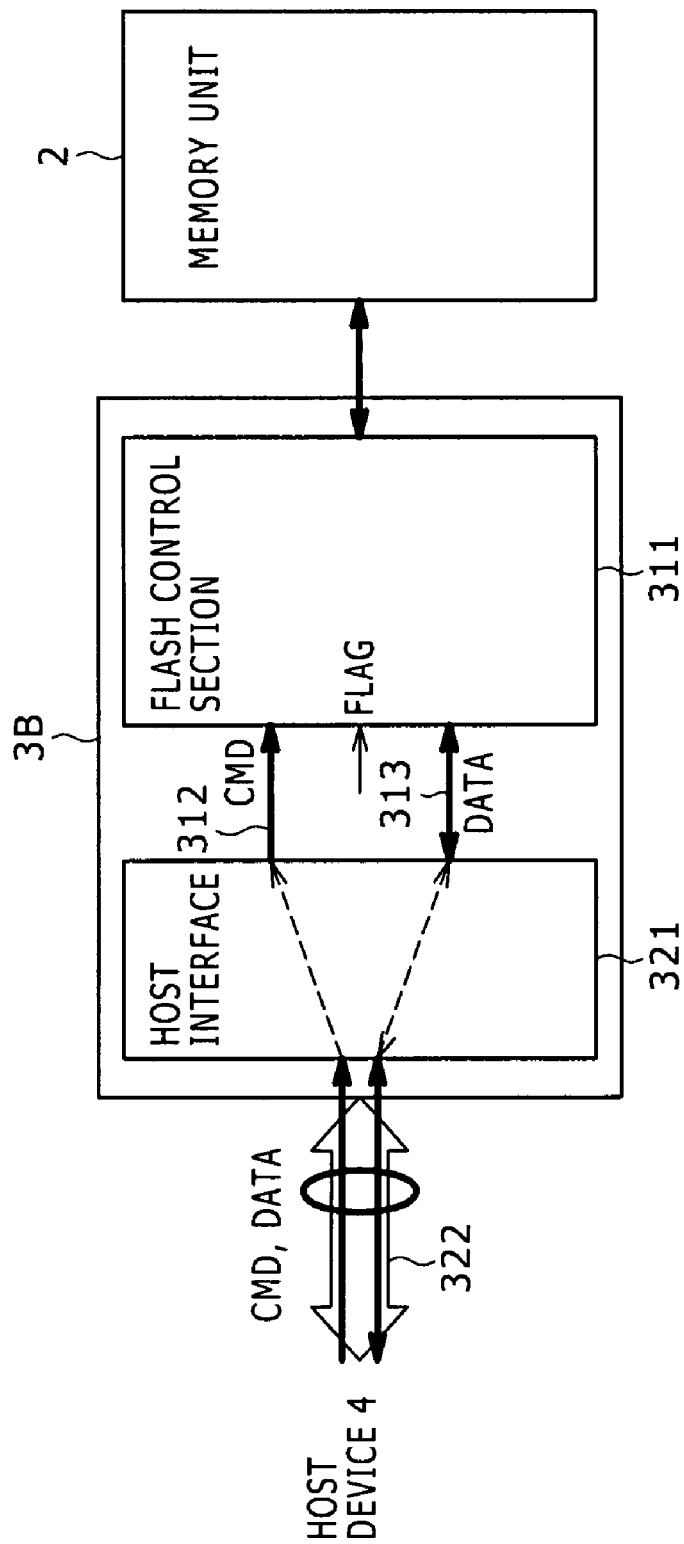
FIG. 19 is a schematic view showing a typical structure of the controller for selecting a trade-off in accordance with a flag according to the embodiment of FIG. 13.

Described below is a more detailed structure of the controllers 3 and 3A handling the above-described procedures for selecting trade-offs. FIG. 19 is a schematic view showing a typical structure of a controller 3B for selecting a trade-off in accordance with the flag arrangement according to the embodiment of the invention.

The controller 3B in FIG. 19 is roughly divided into a flash control section 311 and a host interface 321. Depending on the flag input to the flash control section 311, the controller 3B selects one of a plurality of trade-offs.

Signal lines 312 and 313 are furnished interposingly between the host interface 321 and the flash control section 311. The signal line 312 carries commands (CMD) issued by the host device 4 through the host interface 321 to the flash control section 311. The signal line 313 transfers data between the host device 4 and the flash control section 311 through the host interface 321.

The host device 4 and the host interface 321 are connected by a host interface bus 322 that carries both commands and data. The command and the data may be either multiplexed or carried over separate signal lines when transferred through the host interface bus 322.

Figure 20:
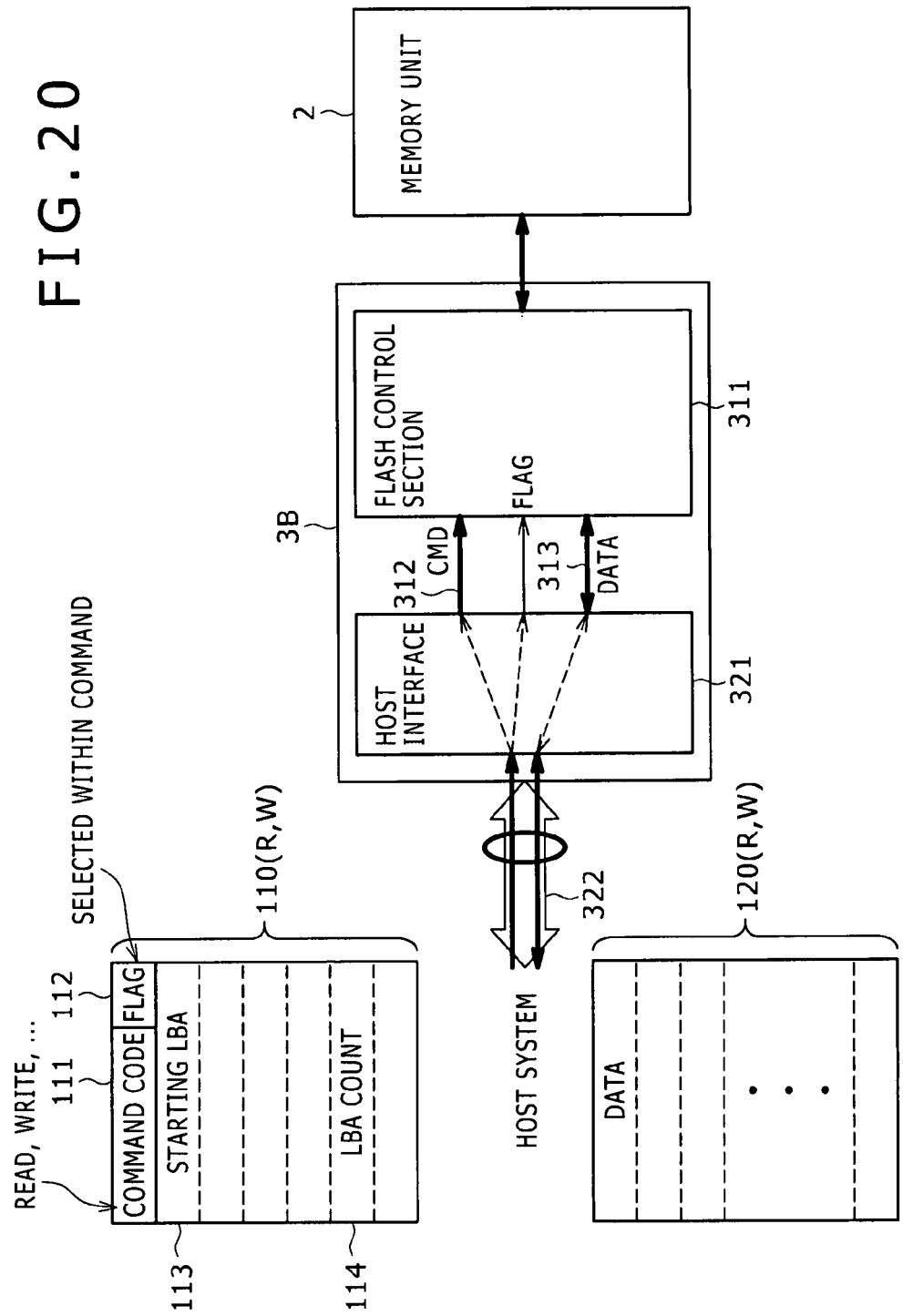
FIG. 20 is a schematic view showing how a trade-off is selected by embedding a flag in a read command or a write command issued by the host device.
Figure 21:
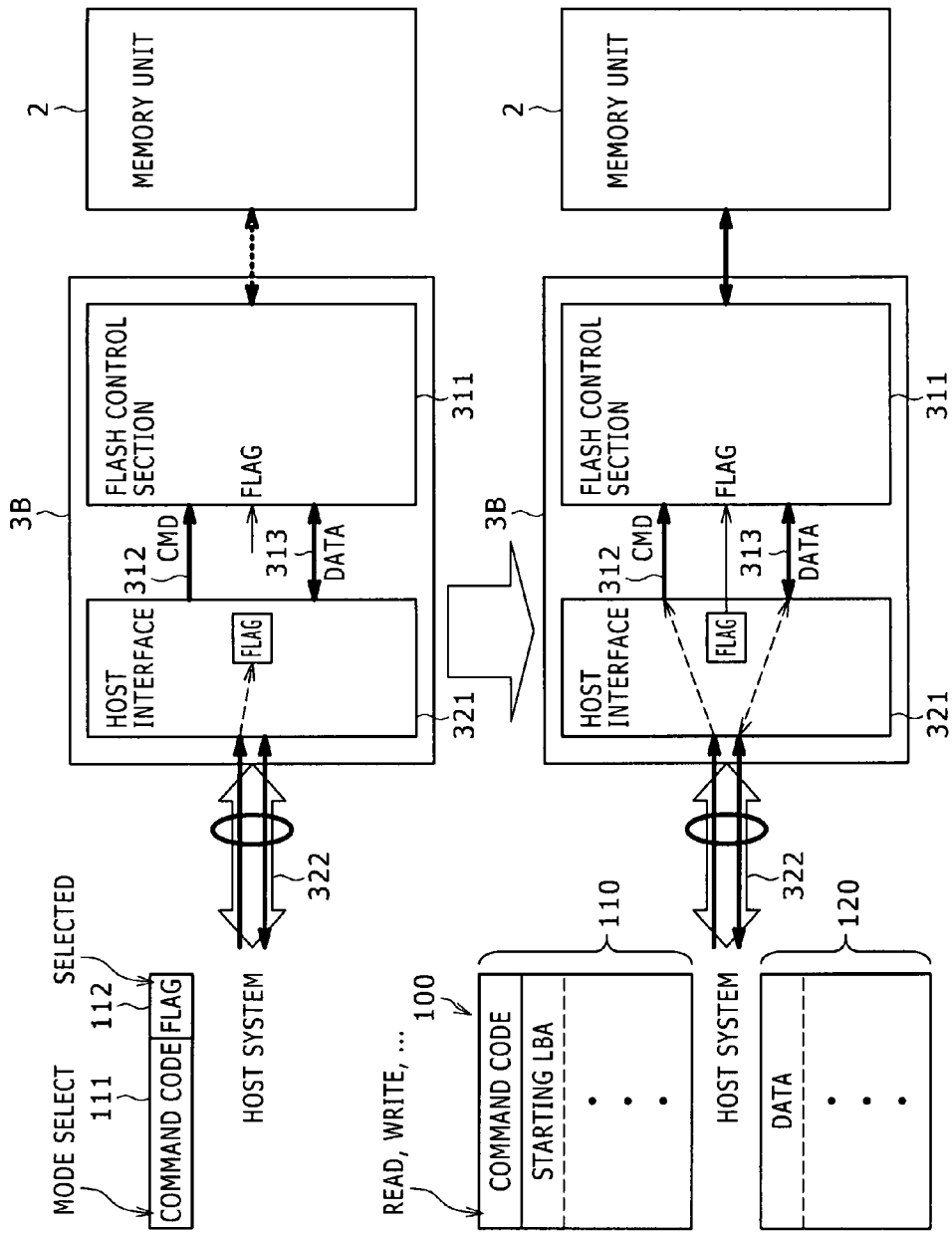
FIG. 21 is a schematic view showing how a flag is set in a command issued by the host device in advance of a read command or a write command which, when subsequently issued, uses the flag setting to select a trade-off.
Figure 22:
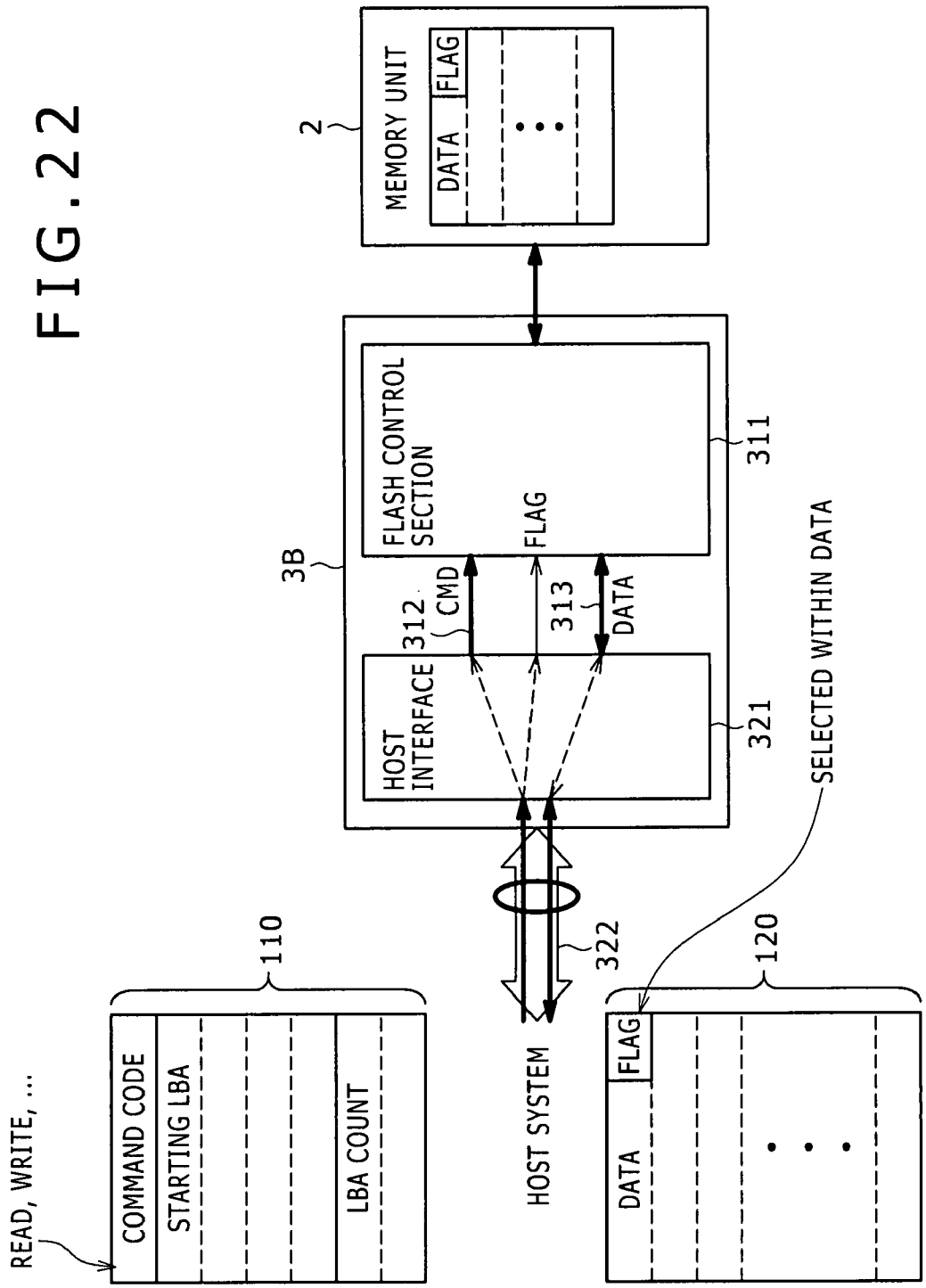
FIG. 22 is a schematic view showing how a trade-off is selected using a flag in the data to be read or written.

Described below in reference to FIGS. 20, 21 and 22 is how flags are designated in conjunction with the controller 3B. Part of the ensuing description may overlap with what has already been discussed above.

FIG. 20 is a schematic view showing how a trade-off is selected by embedding a suitable flag in the read or write command issued by the host device 4. This is an example in which part of the command sent by the host device 4 is used to accommodate the flag, as discussed above with reference to FIGS. 11 and 15. An optimum trade-off can be designated by the host device 4 using each command in this manner.

FIG. 21 is a schematic view showing how a flag is set in a command issued by the host device 4 in advance of the read or write command which, when subsequently issued, uses the flag setting to select a trade-off. In the example of FIG. 21, a mode select command is issued apart from the read or write command. A selection flag attached to the mode select command is stored illustratively into a register of the host interface 321. When the read or write command is subsequently received, the flag information held in the register is used as the basis for selecting a trade-off.

An advantage of this trade-off selecting method is that it can be adopted by expanding the existing system without modifying the read and write commands that have been used so far. Another advantage is that there is no need to repeat the same settings in subsequently issued commands.

FIG. 22 is a schematic view showing how a trade-off is selected using a flag in the data to be read or written. In a read operation, the flag placed in the read data is used for trade-off selection. That means the controller 3B selects a trade-off based on the read data itself. In a write operation, too, the host device need not be involved in selecting trade-offs when the flag is placed in the data.

The flag embedded in data for trade-off selection within the nonvolatile memory system may be replaced by other suitable arrangements, such as the QoS flag in network packets.

FIG. 23 is a schematic view showing how a trade-off is otherwise selected using the flag that is automatically selected from within the data in accordance with a data format analyzed by the controller. It might happen that diverse data formats such as those of FAT information, system files and moving picture files in MPEG format are in use and they have to have various parameters emphasized, including different levels of reliability and different speeds of processing. In such cases, the controller 3B is arranged to select automatically an optimum trade-off selecting method by determining the format of the data currently in use.

The formats of data handled by the host device 4 are quite varied and so are their parameters to be stressed. For example, reliability is particularly important for system files and FAT information while transfer speed is critical for moving picture data. With the moving picture data format, for example, some bit errors simply pass unnoticed or are corrected by the error-correcting arrangement furnished within the data. A particular parameter of given data that needs to be emphasized can be identified in many cases by checking the format of the data in question.

In the controller 3B, the flash control section 311 and host interface 321 work to determine the format of data. The controller 3B then adopts the trade-off selecting method suitable for the data format thus determined, whereby the data of interest is read or written in an optimum manner.

In the setup of FIG. 23, the file format is analyzed and an appropriate flag is issued in keeping with the detected format. Illustratively, if the data file is found to be in FAT format, the flag is set to "10" for a read operation and to "00" for a write operation. If the file is in MPEG format, the flag is set to "00" for a read operation and to "10" for a write operation. If the file is in DB format, the flag is set to "10" for a read operation and to "01" for a write operation. If the file is in RAW format, the flag is set to "10" for a read operation and to "11" for a write operation.

According to the embodiments of the present invention, as described above, trade-offs between performance and reliability can be selected by the user as desired or in keeping with data format in the nonvolatile memory system. This makes it possible to improve read/write performance while maintaining a desired level of reliability.

Where unnecessary circuits are selectively deactivated, the user can also select trade-offs among power dissipation, performance and reliability. By selecting a suitable trade-off, the user can thus save on power as well.

In other words, when specific parameters are suitably controlled illustratively from the host device during write and read operations, the level of reliability desired at any given point in time can be attained while maximum performance is realized under the constraints.

Also according to the embodiments of the invention, trade-offs can be selected not only between reliability and performance but also between two eventualities: if the write command is forcibly terminated during execution, for example, there may occur a plurality of blocks each having the same logical address. Then the user can make a choice: either to select the latest but potentially erroneous block, or to select the older but integrally written block.

It should be understood by those skilled in the art that various modifications, combinations, sub-combinations and alterations may occur depending on design requirements and other factor in so far as they are within the scope of the appended claims or the equivalents thereof.

What is claimed is:

1. A nonvolatile semiconductor memory apparatus comprising:
   a nonvolatile memory configured to be electrically rewritable; and
   a controller configured to control access to said nonvolatile memory based on information about access to said nonvolatile memory;
   wherein said controller selects one of a plurality of trade-offs between access reliability and performance and carries out access control in accordance with the selected trade-off, and
   wherein said information about said access includes either a data write command or a data read command issued by a host device and additional information attached to the command, said additional information being set to correspond to the plurality of trade-offs.

2. The nonvolatile semiconductor memory apparatus according to claim 1, wherein said controller selects management information writing frequency upon data write as one of said plurality of trade-offs and carries out access control in accordance with the selected management information writing frequency.

3. The nonvolatile semiconductor memory apparatus according to claim 1, wherein said controller selects a degree of use of error checking and correction as one of said plurality of trade-offs and carries out access control in accordance with the selected degree of use of error checking and correction.

4. The nonvolatile semiconductor memory apparatus according to claim 1, wherein said additional information is flag information such that said information about said access includes the flag information attached to the command, said flag information being set to correspond to the plurality of trade-offs; and
   said controller carries out access control in accordance with said flag information.

5. The nonvolatile semiconductor memory apparatus according to claim 1, wherein said information about said access includes a command and flag information attached to said command, said command being issued apart from and prior to either a data write command or a data read command issued by a host device, said flag information being set to correspond to a plurality of trade-offs; and
   said controller carries out access control in accordance with said flag information.

6. The nonvolatile semiconductor memory apparatus according to claim 1, wherein said information about said access includes data and flag information attached to said data, said flag information being set to correspond to a plurality of trade-offs; and
   said controller carries out access control in accordance with said flag information.

7. The nonvolatile semiconductor memory apparatus according to claim 1, wherein said controller analyzes a data format, selects one of said plurality of trade-offs in accordance with a result of the analysis, and carries out access control in keeping with the selected trade-off.

8. A memory system comprising:
   a nonvolatile memory configured to be electrically rewritable;
   a controller configured to control access to said nonvolatile memory based on information about access to said nonvolatile memory; and
   a host device configured to issue commands to said controller for access to said nonvolatile memory;
   wherein said controller selects one of a plurality of trade-offs between access reliability and performance and carries out access control in accordance with the selected trade-off, and
   wherein said information about said access includes either a data write command or a data read command issued by a host device and additional information attached to the command, said additional information being set to correspond to the plurality of trade-offs.

9. The memory system according to claim 8, wherein said controller selects management information writing frequency upon data write as one of said plurality of trade-offs and carries out access control in accordance with the selected management information writing frequency.

10. The memory system according to claim 8, wherein said controller selects a degree of use of error checking and correction as one of said plurality of trade-offs and carries out access control in accordance with the selected degree of use of error checking and correction.

11. The memory system according to claim 8, wherein said additional information is flag information such that said information about said access includes the flag information attached to the command, said flag information, being set to correspond to the plurality of trade-offs; and
    said controller carries out access control in accordance with said flag information.

12. The memory system according to claim 8, wherein said information about said access includes a command and flag information attached to said command, said command being issued apart from and prior to either a data write command or a data read command issued by a host device, said flag information being set to correspond to a plurality of trade-offs; and
said controller carries out access control in accordance with said flag information.

13. The memory system according to claim 8, wherein said information about said access includes data and flag information attached to said data, said flag information being set to correspond to a plurality of trade-offs; and
said controller carries out access control in accordance with said flag information.

14. The memory system according to claim 8, wherein said controller analyzes a data format, selects one of said plurality of trade-offs in accordance with a result of the analysis, and carries out access control in keeping with the selected trade-off.

* * * * *